US012034950B2

(12) United States Patent
Zhang et al.

(10) Patent No.: US 12,034,950 B2
(45) Date of Patent: Jul. 9, 2024

(54) VIDEO DECODING METHOD AND APPARATUS, VIDEO ENCODING METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Hong Bin Zhang, Shanghai (CN); Xiang Li, Saratoga, CA (US); Guichun Li, San Jose, CA (US); Shan Liu, San Jose, CA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 203 days.

(21) Appl. No.: 17/506,784

(22) Filed: Oct. 21, 2021

(65) Prior Publication Data

US 2022/0046260 A1 Feb. 10, 2022

Related U.S. Application Data

(63) Continuation of application No. PCT/CN2020/134581, filed on Dec. 8, 2020.

(30) Foreign Application Priority Data

Dec. 18, 2019 (CN) .......................... 201911309768.6

(51) Int. Cl.
*H04N 19/00* (2014.01)
*H04N 19/122* (2014.01)
(Continued)

(52) U.S. Cl.
CPC ........... *H04N 19/44* (2014.11); *H04N 19/122* (2014.11); *H04N 19/159* (2014.11);
(Continued)

(58) Field of Classification Search
CPC ....................................................... H04N 19/00
See application file for complete search history.

(56) References Cited

U.S. PATENT DOCUMENTS

| 2013/0128961 A1* | 5/2013 | Kim ..................... H04N 19/117 |
| | | 375/240.03 |
| 2014/0079329 A1 | 3/2014 | Shibahara et al. |

(Continued)

FOREIGN PATENT DOCUMENTS

| CN | 101835039 A | 9/2010 |
| CN | 104170382 A | 11/2014 |

(Continued)

OTHER PUBLICATIONS

Philippe De Lagrange , etal., "Non-CE7: Quantization matrices with single identifier and prediction from larger ones", Inter Digital Communications, Inc., Joint Video Experts Team (JVET) of ITU-T SG16 WP3 and ISOJEC JTC 1/SC29/WG 11, 15th Meeting, JVET-O0223, Jul. 3-12, 2019, pp. 1-14, Gothenburg, SE (Year: 2019).*

(Continued)

*Primary Examiner* — Maryam A Nasri
(74) *Attorney, Agent, or Firm* — Sughrue Mion, PLLC

(57) ABSTRACT

Video decoding and encoding methods and apparatuses are provided. The decoding method includes: obtaining a first parameter set corresponding to a to-be-decoded video frame; determining an effective quantization matrix (QM) according to syntax elements included in the first parameter set, the effective QM being a QM actually used for inversely quantizing quantized transform coefficients during decoding of the to-be-decoded video frame; and decoding the effective QM.

19 Claims, 8 Drawing Sheets

(51) Int. Cl.
*H04N 19/159* (2014.01)
*H04N 19/196* (2014.01)
*H04N 19/44* (2014.01)
*H04N 19/70* (2014.01)
*H04N 19/96* (2014.01)

(52) U.S. Cl.
CPC ........... *H04N 19/196* (2014.11); *H04N 19/70* (2014.11); *H04N 19/96* (2014.11)

(56) References Cited

U.S. PATENT DOCUMENTS

| | | |
|---|---|---|
| 2014/0177728 A1 | 6/2014 | Zhang et al. |
| 2015/0043637 A1 | 2/2015 | Morigami et al. |
| 2019/0149823 A1 | 5/2019 | Lim et al. |

FOREIGN PATENT DOCUMENTS

| | | |
|---|---|---|
| CN | 110536133 A | 12/2019 |
| CN | 111050171 A | 4/2020 |
| EP | 2 495 973 A1 | 9/2012 |
| EP | 2 806 640 A1 | 11/2014 |
| JP | 2015-504289 A | 2/2015 |
| WO | 2013/154028 A1 | 10/2013 |

OTHER PUBLICATIONS

Hongbin Zhang et al., "AHG15: Improvement for Quantization Matrix Signaling", Joint Video Experts Team (JVET) of ITU -T SG 16 WP 3 and ISO/IEC JTC 1/SC 29ANG 11, 17th meeting, JVET-Q0505, Jan. 7-17, 2020, Brussels, BE, pp. 1-8 (8 total pages) (Year: 2020).*

Communication dated Apr. 4, 2023 in European Application No. 20902574.1.

Extended European Search Report dated Mar. 16, 2023 in Application No. 20902574.1.

Olena Chubach et al., "CE7-related: Support of quantization matrices for VVC", Joint Video Experts Team (JVET) of ITU-T SG 16 WP 3 and ISO/IEC JTC 1/SC 29/WG 11, 14th meeting, JVET-N0847-v1, Mar. 19-27, 2019, Geneva, CH (4 total pages).

Hongbin Zhang et al., "AHG15: Improvement for Quantization Matrix Signaling", Joint Video Experts Team (JVET) of ITU-T SG 16 WP 3 and ISO/IEC JTC 1/SC 29/WG 11, 17th meeting, JVET-Q0505, Jan. 7-17, 2020, Brussels, BE, pp. 1-8 (8 total pages).

Notification of Reasons for Refusal dated May 8, 2023 from the Japanese Patent Office in Application No. 2022-515567.

Philippe De Lagrange, et al., "Non-CE7: Quantization matrices with single identifier and prediction from larger ones", InterDigital Communications, Inc., Joint Video Experts Team (JVET) of ITU-T SG 16 WP 3 and ISO/IEC JTC 1/SC 29/WG 11, 15th Meeting, JVET-O0223, Jul. 3-12, 2019, pp. 1-14, Gothenburg, SE.

Philippe De Lagrange, et al., "AHG15: Quantization matrices with single identifier and enhanced prediction", InterDigital, Joint Video Experts Team (JVET) of ITU-T SG 16 WP 3 and ISO/IEC JTC 1/SC 29/WG 11, 16th Meeting, JVET-P0110-v2, Oct. 1-11, 2019, pp. 1-15, Geneva, CH.

Tomonori Hashimoto, et al., "AHG15: Signaling scaling matrix for LFNST case", Sharp Corporation, InterDigital, Joint Video Experts Team (JVET) of ITU-T SG 16 WP 3 and ISO/IEC JTC 1/SC 29/WG 11, 16th Meeting, JVET-P0293-v3, Oct. 1-11, 2019, pp. 1-6, Geneva, CH.

Tadamasa Toma, et al., "AHG18: Support of quantization matrices", Panasonic, Electronics and Telecommunications Research Institute (ETRI), Joint Video Exploration Team (JVET) of ITU-T SG 16 WP 3 and ISO/IEC Jtc 1/SC 29/WG 11, 14th Meeting, JVET-N0204-v1, Mar. 19-27, 2019, pp. 1-12, Geneva, CH.

International Search Report for PCT/CN2020/134581 dated Feb. 26, 2021 (PCT/ISA/210).

Written Opinion for PCT/CN2020/134581 dated Feb. 26, 2021 (PCT/ISA/237).

Office Action dated Sep. 25, 2023 in Japanese Application No. 2022-515567.

* cited by examiner

Current video frame

VIDEO DECODING METHOD AND APPARATUS, VIDEO ENCODING METHOD AND APPARATUS, DEVICE, AND STORAGE MEDIUM

CROSS-REFERENCE TO RELATED APPLICATIONS

This application is a bypass continuation application of International Application No. PCT/CN2020/134581, filed on Dec. 8, 2020, which claims priority to Chinese Patent Application No. 201911309768.6, filed on Dec. 18, 2019, the disclosures of which are herein incorporated by reference in their entireties.

FIELD

Embodiments relate to video encoding and decoding technologies, and in particular, to a video decoding method and apparatus, a video encoding method and apparatus, a device, and a storage medium.

BACKGROUND

H.266 is a new generation of video encoding technology improved based on H.265/High Efficient Video Coding (HEVC), and has been officially named Versatile Video Coding (VVC). It is organized and guided by the Joint Video Experts Team (JVET) for constant updating and improvement.

Quantization matrices (QMs) in the following two forms may be used in VVC: a default QM and a user-defined QM, to support frequency-dependent scaling. In a case that a QM is enabled, transform coefficients in a transform block (TB) may be individually quantized according to a quantization coefficient (that is, an integer weighted value) included in the QM.

In a related decoding method of a quantization matrix used in VVC, the computational complexity of a decoder side is relatively high.

SUMMARY

One or more embodiments provide a video decoding method and apparatus, a video encoding method and apparatus, a device, and a storage medium, which can reduce computational complexity of a decoder side.

According to an aspect of an embodiment, a video decoding method includes:

obtaining a first parameter set corresponding to a to-be-decoded video frame, the first parameter set including related syntax elements used for defining a QM;

determining an effective QM according to the syntax elements included in the first parameter set, the effective QM being a QM actually used for inversely quantizing quantized transform coefficients during decoding of the to-be-decoded video frame; and decoding the effective QM.

According to an aspect of an embodiment, a video encoding method includes:

determining an effective quantization matrix (QM) corresponding to a to-be-encoded video frame, the effective QM being a QM actually used for quantizing transform coefficients during encoding of the to-be-encoded video frame; and encoding a syntax element used for determining the effective QM and the effective QM, to generate a bitstream corresponding to a first parameter set, the first parameter set including related syntax elements used for defining a QM.

According to an aspect of an embodiment, a video decoding apparatus includes:

at least one memory configured to store program code; and at least one processor configured to read the program code and operate as instructed by the program code, the program code including:

parameter obtaining code configured to cause at least one of the at least one processor to obtain a first parameter set corresponding to a to-be-decoded video frame, the first parameter set including related syntax elements used for defining a QM; and QM determining code configured to cause at least one of the at least one processor to determine an effective QM according to the syntax elements included in the first parameter set, the effective QM being a QM actually used for inversely quantizing quantized transform coefficients during decoding of the to-be-decoded video frame; and QM decoding code configured to cause at least one of the at least one processor to decode the effective QM.

According to an aspect of an embodiment, a video encoding apparatus includes:

at least one memory configured to store program code; and at least one processor configured to read the program code and operate as instructed by the program code, the program code including:

QM determining code configured to cause at least one of the at least one processor to determine an effective QM corresponding to a to-be-encoded video frame, the effective QM being a QM actually used for quantizing transform coefficients during encoding of the to-be-encoded video frame; and QM encoding code configured to cause at least one of the at least one processor to encode a syntax element used for determining the effective QM and the effective QM, to generate a bitstream corresponding to a first parameter set, the first parameter set including related syntax elements used for defining a QM.

According to an aspect of an embodiment, a computer device includes a processor and a memory, the memory storing at least one instruction, at least one program, a code set, or an instruction set, the at least one instruction, the at least one program, the code set, or the instruction set being loaded and executed by the processor to implement the foregoing video decoding method, or implement the foregoing video encoding method.

According to an aspect of an embodiment, a computer-readable storage medium stores at least one instruction, at least one program, a code set, or an instruction set, the at least one instruction, the at least one program, the code set, or the instruction set being loaded and executed by a processor to implement the foregoing video decoding method, or implement the foregoing video encoding method.

According to an aspect of an embodiment, a computer program product, the computer program product, when executed by a processor, being configured to implement the foregoing video decoding method, or implement the foregoing video encoding method.

BRIEF DESCRIPTION OF THE DRAWINGS

The above and other aspects, features, and advantages will be more clearly understood from the following description, taken in conjunction with the accompanying drawings in which.

DETAILED DESCRIPTION

Embodiments will now be described more fully with reference to the accompanying drawings.

Figure 1:
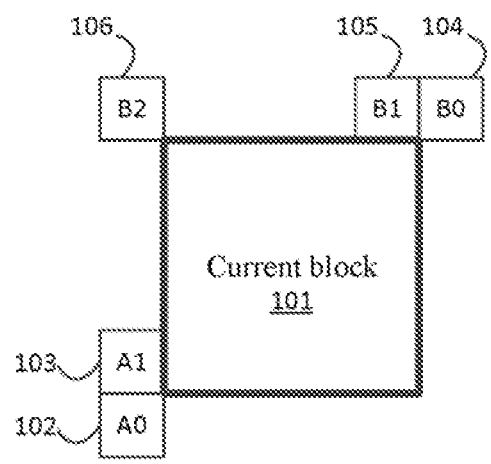
FIG. 1 is a schematic exemplary diagram of video encoding according to an embodiment.

Referring to FIG. 1, a current block 101 includes a sample having been found by an encoder during a motion search, and the sample may be predicted according to a previous block that has the same size and has generated a spatial offset. In addition, a motion vector (MV) may be exported from metadata associated with one or more reference pictures, rather than being directly encoded. For example, an MV associated with any one of five surrounding samples of A0, A1, B0, B1, and B2 (corresponding to 102 to 106 respectively) is used to export the MV from metadata of a nearest reference picture (according to a decoding sequence).

Figure 2:
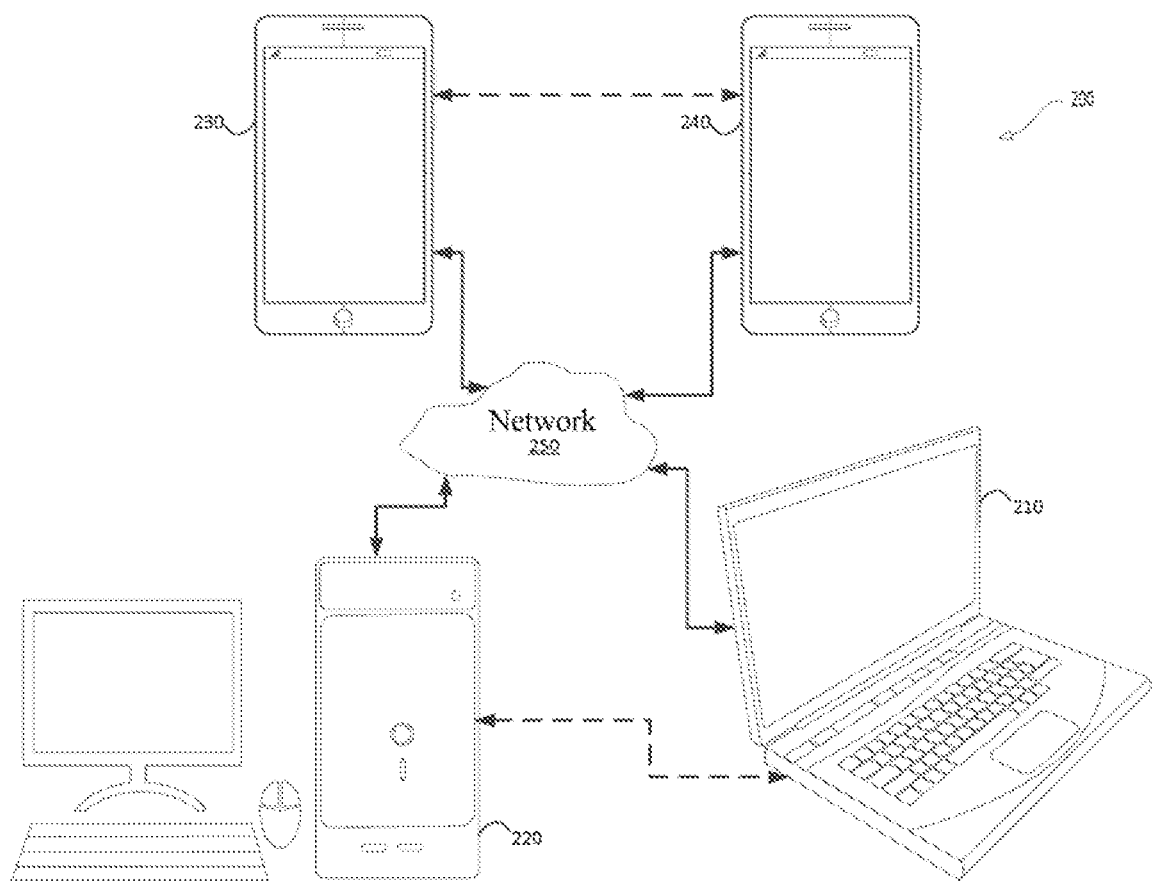
FIG. 2 is a simplified block diagram of a communication system according to an embodiment.

FIG. 2 is a simplified block diagram of a communication system according to an embodiment. The communication system 200 includes a plurality of devices. The devices may communicate with each other, for example, by using a network 250. For example, the communication system 200 includes a first device 210 and a second device 220 connected to each other by using the network 250. In an embodiment, the first device 210 and the second device 220 perform one-way data transmission. For example, the first device 210 may encode video data, for example, a video picture captured by the first device 210, to transmit the video data to the second device 220 by using the network 250. Encoded video data is transmitted in a form of one or more encoded video code streams. The second device 220 may receive the encoded video data from the network 250, decode the encoded video data to restore the video data, and display the video picture according to the restored video data. For example, the one-way data transmission may be used in a media service application.

In another embodiment, the communication system 200 includes a third device 230 and a fourth device 240 that perform two-way transmission of encoded video data. The two-way transmission may occur, for example, during a video conference. For two-way data transmission, each of the third device 230 and the fourth device 240 may encode video data (for example, a video picture stream captured by the device), to transmit the encoded video data to the other of the third device 230 and the fourth device 240 by using the network 250. Each of the third device 230 and the fourth device 240 may further receive the encoded video data transmitted by the other of the third device 230 and the fourth device 240, may decode the encoded video data to restore the video data, and may display the video picture on an accessible display apparatus according to the restored video data.

As shown in FIG. 2, the first device 210, the second device 220, the third device 230, and the fourth device 240 may be computer devices such as servers, personal computers (PCs), and smartphones. However, the principle disclosed in this application is not limited herein. Embodiments are applicable to a PC, a mobile phone, a tablet computer, a media player and/or dedicated video conference device. The network 250 represents any quantity of networks that transmit encoded video data among the first device 210, the second device 220, the third device 230, and the fourth device 240, and include, for example, a wired and/or wireless communication network. The communication network 250 may exchange data in a circuit-switched and/or packet-switched channel. The network may include a telecommunications network, a local area network, a wide area network, and/or the Internet.

Figure 3:
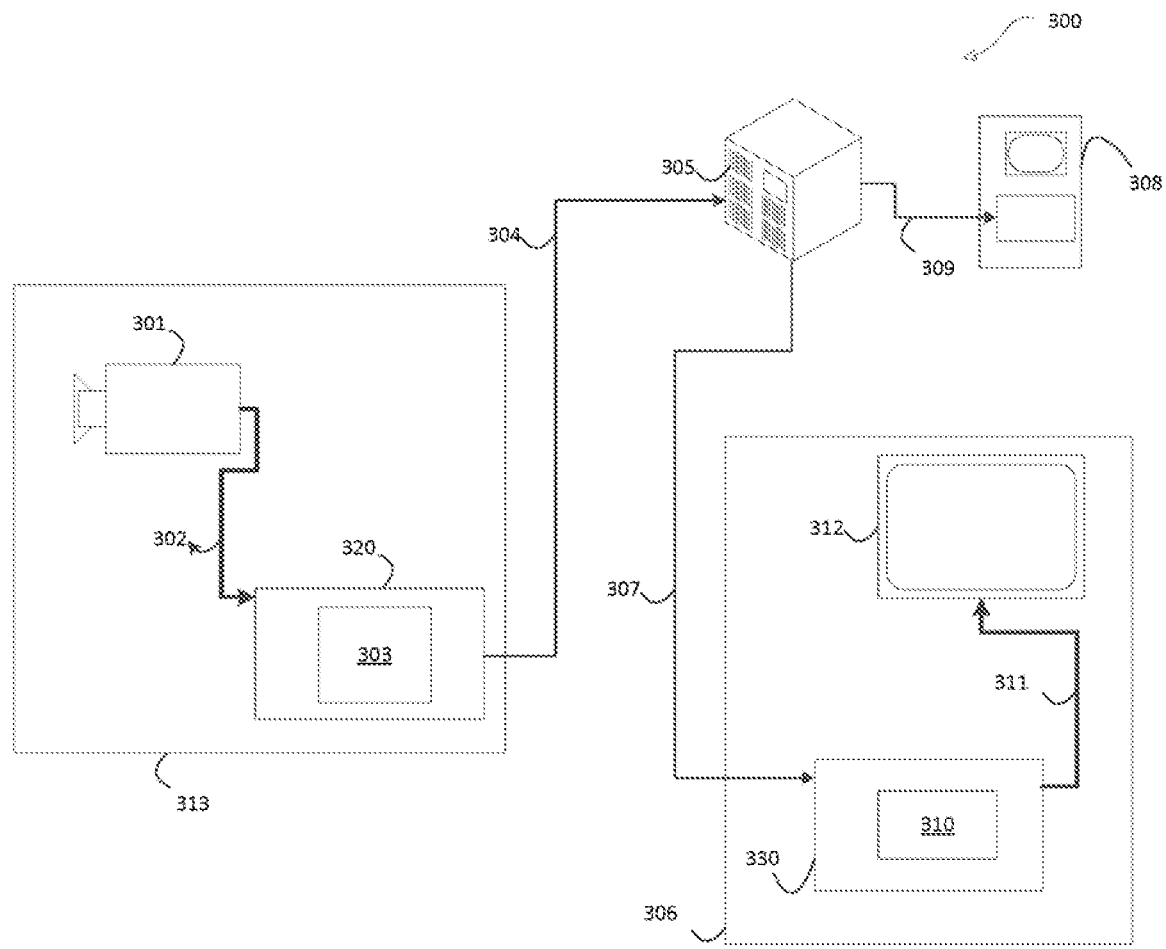
FIG. 3 is a schematic exemplary diagram of placement manners of a video encoder and a video decoder in a streaming transmission environment according to an embodiment.

FIG. 3 is a schematic exemplary diagram of placement manners of a video encoder and a video decoder in a streaming transmission environment according to an embodiment. FIG. 3 shows placement manners of a video encoder and a video decoder in a streaming transmission environment. Embodiments are not limited thereto, and may be equally applicable to other video-supporting applications such as a video conference application and a digital TV (television), to store and compress a video and the like on a digital media a compact disc (CD), a digital versatile disc (DVD), a memory stick, and the like.

A streaming transmission system may include an acquisition subsystem 313. The acquisition subsystem may include a video source 301 such as a digital camera. The video source creates an uncompressed video picture stream 302. In an embodiment, the video picture stream 302 includes a sample captured by a digital camera. Compared with encoded video data 304 (or an encoded video bitstream), the video picture stream 302 is described in a thick line to emphasize a video picture stream with a large data volume. The video picture stream 302 may be processed by an electronic device 320. The electronic device 320 includes a video encoder 303 coupled to the video source 301. The video encoder 303 may include hardware, software, or a combination of hardware and software to implement or perform the aspects of the disclosed subject as described in more detail below. Compared with the video picture stream 302, the encoded video data 304 (or an encoded video bitstream 304) is described in a thin line to emphasize encoded video data 304 (or the encoded video bitstream 304) with a relatively small data volume, which may be stored on a steaming transmission server 305 for future use. One or more streaming transmission client subsystems, such as client subsystem 306 and client subsystem 308 in FIG. 3, may access a streaming transmission server 305 to retrieve a copy 307 and a copy 309 of the encoded video data 304. The client subsystem 306 may include, for example, a video decoder 310 in an electronic device 330. The video decoder 310 decodes the incoming copy 307 of the encoded video data and produces an output video picture stream 311 that may be presented on a display 312 (for example, a display screen) or another presentation apparatus (not depicted). In some streaming transmission systems, the encoded video data 304, the video data 307, and the video data 309 (for example, a video bitstream) may be encoded according to some video encoding/compression standards.

The electronic device 320 and the electronic device 330 may include other components. For example, the electronic device 320 may include a video decoder, and the electronic device 330 may further include a video encoder. The video decoder is configured to decode received encoded video data; and the video encoder is configured to encode video data.

Figure 4:
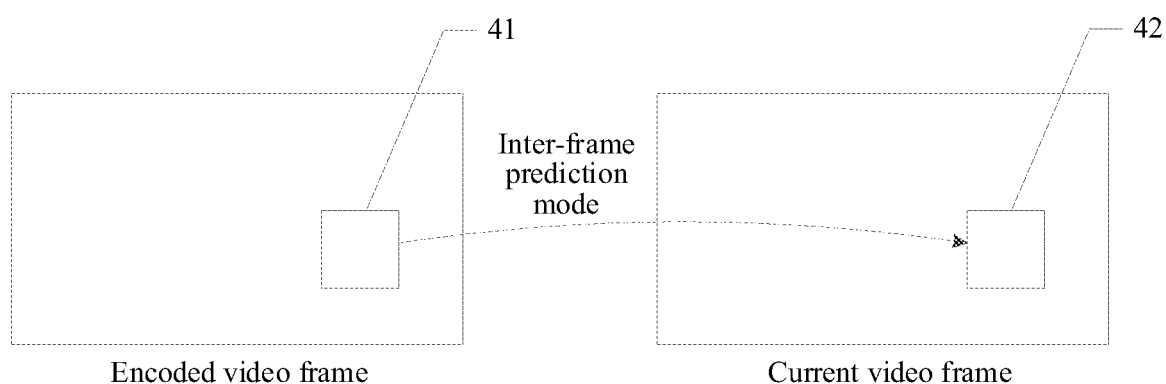
FIG. 4 is a schematic diagram of encoding in an inter-frame prediction mode according to an embodiment.
Figure 5:
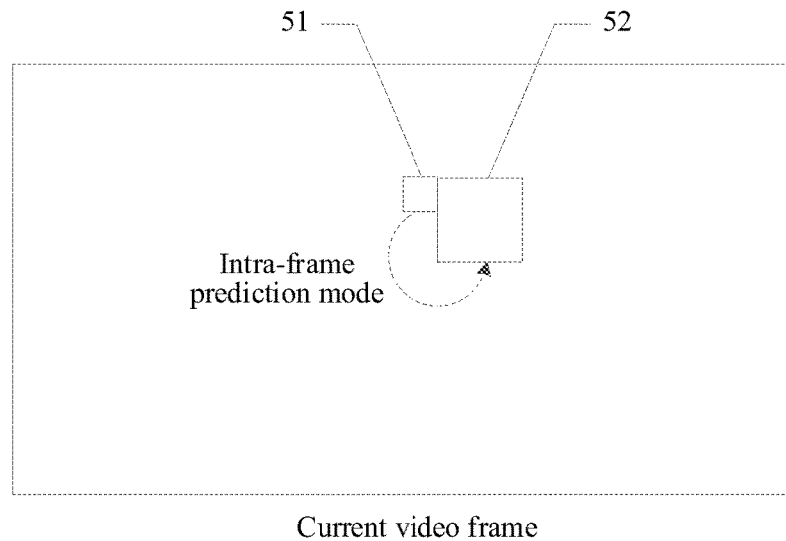
FIG. 5 is a schematic diagram of encoding in an intra-frame prediction mode according to an embodiment.

FIG. 4 is a schematic diagram of encoding in an inter-frame prediction mode according to an embodiment. FIG. 5 is a schematic diagram of encoding in an intra-frame prediction mode according to an embodiment When an image block in a video frame is encoded, an inter-frame prediction mode or intra-frame prediction mode may be used, to generate a prediction block based on one or more encoded reference blocks. The prediction block may be an estimated version of an original block. A residual block may be generated by subtracting the original block from the prediction block, and vice versa. The residual block may be used for representing a predicted residual (or referred to as a predicted error). Because a data volume required for representing the predicted residual may be usually less than a data volume required for representing the original block, the residual block may be encoded to achieve a relatively high compress ratio. For example, as shown in FIG. 4, for the inter-frame prediction mode, an encoded reference block 41 and a to-be-encoded block 42 are located in two different video frames. As shown in FIG. 5, for the intra-frame prediction mode, an encoded reference block 51 and a to-be-encoded block 52 are located in the same video frame.

Subsequently, a residual value of a residual block in a spatial domain may be converted into a transform coefficient in a frequency domain. The conversion may be implemented through a two-dimensional transform such as a discrete cosine transform (DCT). In a transformation matrix, a low-index transform coefficient (for example, located in an upper left region) may correspond to a large spatial feature and has a relatively large magnitude; and a high-index transform coefficient (for example, located in a lower right region) may correspond to small spatial feature and has a relatively small magnitude. Further, a QM including a quantization coefficient may be applied to a transformation matrix, to quantize all transform coefficients into quantized transform coefficients. A quantization result is that scales or magnitudes of transform coefficients may be reduced. Some high-index transform coefficients may be reduced to zero, and then may be skipped in subsequent scanning and encoding operations.

Figure 6:
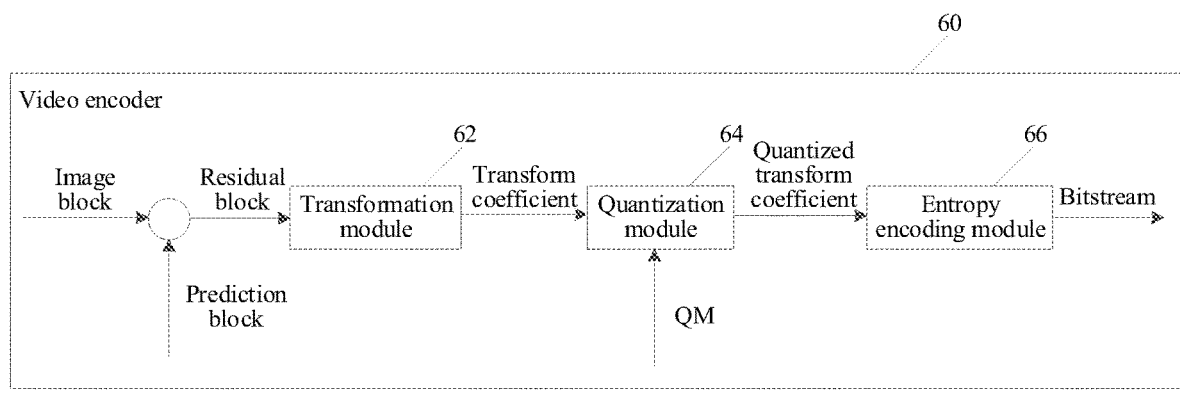
FIG. 6 is a schematic diagram of functional modules of a video encoder according to an embodiment.

FIG. 6 is a schematic diagram of functional modules of a video encoder according to an embodiment. FIG. 6 shows a part of an exemplary video encoder 60 including a transformation module 62, a quantization module 64, and an entropy encoding module 66. It is to be understood that the video encoder 60 may alternatively include other modules such as a prediction module, a dequantization module, and a reconstruction module. During an operation, the video encoder 60 may obtain a video frame. The video frame may include a plurality of image blocks. For ease of brevity, encoding of one image block may be regarded as an example herein. To encode an image block, a prediction block may be first generated as estimation of the image block. With reference to the above, the prediction block may be generated by the prediction module in an inter-frame prediction mode or an intra-frame prediction mode. Subsequently, a difference between the image block and the prediction block may be calculated to generate a residual block. The residual block may be transformed into a transform coefficient by the transformation module 62. During the transformation, a residual value in a spatial domain includes a large feature and a small feature, and is converted into a transform coefficient in a frequency domain. The frequency domain includes a high frequency band and a low frequency band. Subsequently the quantization module 64 may use a QM to quantize the transform coefficient, to generate a quantized transform coefficient. Further, the quantized transform coefficient may be encoded by the entropy encoding module 66, and is finally transmitted from the video encoder 60 as a part of a bitstream.

Figure 7:
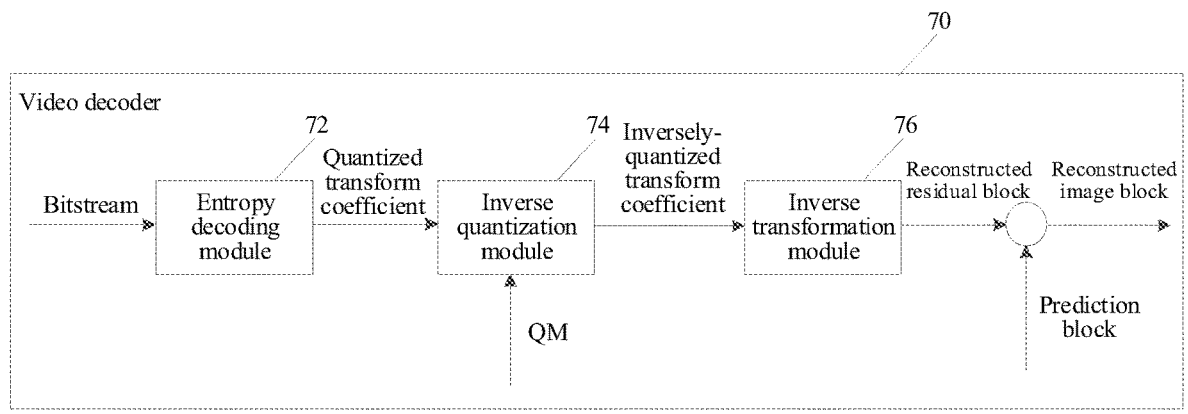
FIG. 7 is a schematic diagram of functional modules of a video decoder according to an embodiment.

FIG. 7 is a schematic diagram of functional modules of a video decoder according to an embodiment. FIG. 7 shows a part of an exemplary video decoder 70 including an entropy decoding module 72, an inverse quantization module 74, and an inverse transformation module 76. It is to be understood that the video decoder 70 may alternatively include other modules such as a prediction module, a transformation module, and a quantization module. During an operation, the video decoder 70 may receive a bitstream outputted from the video encoder 60, and decode the bitstream in an inter-frame prediction mode or an intra-frame prediction mode, and output a reconstructed video frame. The entropy decoding module 72 may generate a quantized transform coefficient by performing entropy decoding on an inputted bitstream. The inverse quantization module 74 may inversely quantize the quantized transform coefficient based on a QM, to obtain an inversely-quantized transform coefficient. The inverse transformation module 76 inversely transforms the inversely-quantized transform coefficient, to generate a reconstructed residual block. Subsequently, a reconstructed image block is generated according to the reconstructed residual block and the prediction block.

It may be seen from the above that the QM is an essential part during video encoding and decoding. How much information of the transform coefficient is retained or filtered out may depend on configuration of the QM, and the QM may affect the encoding performance and encoding quality. Additionally, to correctly decode an image, information about a quantization coefficient in a QM needs to be encoded in the encoder, and the information is transmitted from the encoder to the decoder. In a video encoding and decoding technology and standard, a QM may be sometimes referred to as a scaling matrix or a weight matrix. Therefore, the term "QM" used in this specification may be a general term covering a quantization matrix, a scaling matrix, a weight matrix, and other equivalent terms.

The following describes some concepts involved in embodiments of this disclosure.

1. Quantization Matrix

In a latest version of a VVC test model (VTM) (that is, VTM7), square and non-square TBs are allowed, so that there is a relatively large quantity of QMs. To reduce a quantity of bits and memory requirements of QM signaling, an up-sampling and copying design is adopted for non-square TBs and large square TBs in VVC.

The non-square TBs do not exist in a VVC bitstream, and are obtained by copying corresponding square QMs on a decoder side. More specifically, a 32×4 QM is obtained by copying a $0^{th}$ row, an $8^{th}$ row, a $16^{th}$ row, and a $24^{th}$ row of a 32×32 QM.

Figure 8:
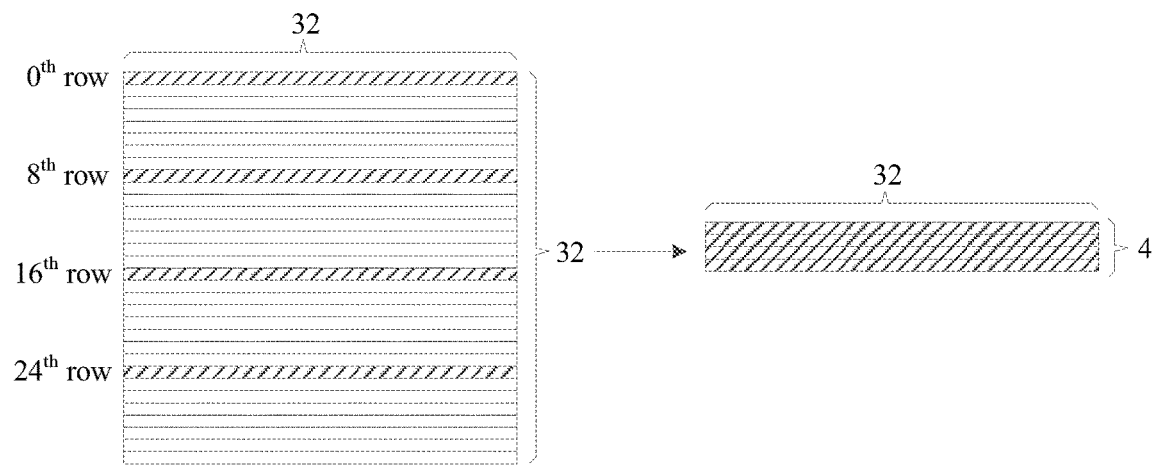
FIG. 8 is a schematic diagram of generating a QM through downsampling and copying according to an embodiment.

FIG. 8 is a schematic diagram of generating a QM through downsampling and copying according to an embodiment. As shown in FIG. 8, the 32×32 QM is downsampled to obtain a 32×4 QM, where the $0^{th}$ row, the $8^{th}$ row, the $16^{th}$ row, and the $24^{th}$ row filled with oblique lines are copied from the 32×32 QM to the 32×4 QM.

When a size of a square TB is greater than 8×8, a corresponding QM size in VTM7 is constrained to 8×8. An upsampling method is used for the 8×8 QMs to create a 16×16 QM, a 32×32 QM, and a 64×64 QM. More specifically, to create a QM with a size of 16×16, each element in a QM with a size of 8×8 corresponding to the QM with a size of 16×16 is upsampled and copied to 2×2 regions; and to create a QM with a size of 32×32, each element in a QM with a size of 8×8 corresponding to the QM with a size of 32×32 is upsampled and copied to 4×4 regions.

Up to 28 QMs need to be encoded in VTM7. In Table 1, identifier (id) variables of QMs are determined according to variables sizeId and variables matrixId that are specified in Table 2 and Table 3 respectively. sizeId represents a size of a QM, matrixId is a QM type id based on a prediction mode (predMode) and a color component (cIdx).

TABLE 1

Determine an id of a QM according to sizeId and matrixId

| id | 0 | 1 | 2 | 3 | 4 | 5 | 6 | 7 | 8 | 9 |
|---|---|---|---|---|---|---|---|---|---|---|
| sizeId | 1 | 1 | 2 | 2 | 2 | 2 | 2 | 2 | 3 | 3 |
| matrixId | 4 | 5 | 0 | 1 | 2 | 3 | 4 | 5 | 0 | 1 |

| id | 10 | 11 | 12 | 13 | 14 | 15 | 16 | 17 | 18 | 19 |
|---|---|---|---|---|---|---|---|---|---|---|
| sizeId | 3 | 3 | 3 | 3 | 4 | 4 | 4 | 4 | 4 | 4 |
| matrixId | 2 | 3 | 4 | 5 | 0 | 1 | 2 | 3 | 4 | 5 |

| id | 20 | 21 | 22 | 23 | 24 | 25 | 26 | 27 | | |
|---|---|---|---|---|---|---|---|---|---|---|
| sizeId | 5 | 5 | 5 | 5 | 5 | 5 | 6 | 6 | | |
| matrixId | 0 | 1 | 2 | 3 | 4 | 5 | 0 | 3 | | |

TABLE 2

Definition standards of sizeId

| Size of QM | sizeId | Decoded QM Parameter ( ) |
|---|---|---|
| 2 × 2 | 1 | 2 × 2 — |
| 4 × 4 | 2 | 4 × 4 — |
| 8 × 8 | 3 | 8 × 8 — |
| 16 × 16 | 4 | 8 × 8  1 DC |
| 32 × 32 | 5 | 8 × 8  1 DC |
| 64 × 64 | 6 | 8 × 8  1 DC |

TABLE 3

Definition standards of matrixId

| sizeId | predMode | cIdx | matrixId |
|---|---|---|---|
| 2, 3, 4, 5, 6 | MODE_INTRA | 0 (Y) | 0 |
| 2, 3, 4, 5, 6 | MODE_INTRA | 1 (Cb) | 1 |
| 2, 3, 4, 5, 6 | MODE_INTRA | 2 (Cr) | 2 |
| 2, 3, 4, 5, 6 | MODE_INTER, MODE_IBC | 0 (Y) | 3 |
| 1, 2, 3, 4, 5, 6 | MODE_INTER, MODE_IBC | 1 (Cb) | 4 |
| 1, 2, 3, 4, 5, 6 | MODE_INTER, MODE_IBC | 2 (Cr) | 5 |

In Table 2, when sizeId is greater than 3, there is a direct current (DC) coefficient, and the DC coefficient is an element value in a position (0, 0) in a QM. In VVC, when a DC value is 0, a default QM is used as the QM, but the QM is still transmitted. A main reason is that for an unencoded QM, reference may be made to the QM. When the DC value is not 0, a user-defined QM is used as the QM, and the QM is encoded in an encoding manner described below for transmission.

In Table 3, MODE_INTRA represents an intra-frame prediction mode, MODE_INTER represents an inter-frame prediction mode, MODE_IBC represents an intra block copy (IBC) prediction mode, Y represents luma, and Cb and Cr represent chroma.

2. QM Encoding Manner

To reduce bit overheads, 28 QMs are encoded through intra-frame prediction encoding and inter-frame prediction encoding in VTM7.

Figure 9:
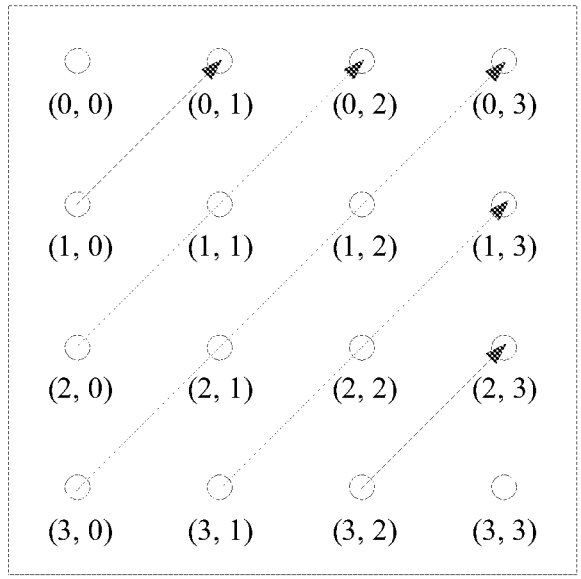
FIG. 9 is a schematic diagram of a diagonal scanning sequence according to an embodiment.

In the intra-frame prediction mode, differential pulse code modulation (DPCM) encoding is applied to a QM in a diagonal scanning sequence. A DPCM intra-frame residual also needs to be transmitted in a bitstream. For example, as shown in FIG. 9, a schematic diagram of a diagonal scanning sequence according to an embodiment, a QM with a size of 4×4 is used as an example. A diagonal scanning sequence is (0, 0), (1, 0), (0, 1), (2, 0), (1, 1), . . . , (2, 3), (3, 3).

There are two inter-frame prediction modes, that is, a copy mode and a prediction mode. In the copy mode, a current QM to be encoded is completely the same as a QM available for decoding and referred to as a reference QM. This also means that the copy mode has zero inter-frame residual, and certainly, it is unnecessary to transmit a signal for residual notification. The encoder shall transmit an increment ID between the current QM and a reference QM thereof, so that the decoder may reconstruct the current QM by directly copying the reference QM. The prediction mode is similar to the copy mode, but has an additional inter-frame residual. The DPCM encoding is applied to an inter-frame residual in a diagonal scanning sequence, and the encoder needs to transmit a DPCM inter-frame residual in a bitstream.

As described above, when sizeId of a QM is greater than 3, an upsampling algorithm is used to copy each element in the QM to a large square region. A DC coefficient of a position (0, 0) is most important to video reconstruction, so that in VTM7, the DC coefficient is directly encoded, rather than being copied from corresponding elements of another QM. For each QM, bit costs of three calculate modes (that is, the copy mode in the inter-frame prediction mode, the prediction mode in the inter-frame prediction mode, and the intra-frame prediction mode) of the QM are calculated through mode decision, and one mode that has the lowest bit cost is selected as a final optimal mode. Subsequently, the optimal mode is used to encode the QM.

3. QM Signaling

VVC supports frequency-dependent quantization of a TB by using a QM. It is assumed that the QM is W, W[x][y]

In an APS, up to 28 groups of a QM encoding mode, a Δid (increment id), an AC coefficient, and a DC coefficient shall be notified. In each APS, 28 groups of QMs are encoded and decoded in ascending order of ids.

In VVC draft 7, syntaxes and semantics of the QM coding mode, the Aid (increment id), the AC coefficient, and the DC coefficient are defined in Table 4 below:

TABLE 4

| scaling_list_data( ) { | Descriptor |
|---|---|
|   scaling_matrix_for_lfnst_disabled_flag | u(1) |
|   for( id = 0; id < 28; id ++ ) | |
|     matrixSize = (id < 2) ? 2 : ( ( id < 8 ) ? 4 : 8 ) | |
|     scaling_list_copy_mode_flag[ id ] | u(1) |
|     if( !scaling_list_copy_mode_flag[ id ] ) | |
|       scaling_list_pred_mode_flag[ id ] | u(1) |
|     if( ( scaling_list_copy_mode_flag[ id ] \| \| scaling_list_pred mode_flag [ id ] ) && | |
|       id != 0 && id != 2 && id != 8 ) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coef[ id − 14 ] | se(v) |
|         nextCoef += scaling_list_dc_coef[ id − 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef[ id ][ i ] | se(v) |
|           nextCoef += scaling_list_delta_coef[ id ][ i ] | |
|         } | |
|         ScalingList[ id ][ i ] = nextCoef | |
|       } | |
|     } | |
|   } | |
| } | | represents a QM weight of a transform coefficient in a position (x, y) in the TB. For a transform coefficient coeff[x][y], a quantized transform coefficient level[x][y] is calculated by using formula 1 below:

$$\text{level } [x][y] = \left(\text{coeff}[x][y] \times \frac{16}{W[x][y] \times QP} + \text{offset}\right) \quad \text{Formula 1}$$

where QP is a quantization parameter (or may be referred to as a quantization step), and offset is an offset value. W[x][y]=16 indicates that the transform coefficient is not weighted in the position (x, y). In addition, when values of all elements in the QM is equal to 16, an effect is the same as an effect of not using a QM.

A syntax element sps_scaling_list_enable_flag of a sequence parameter set (SPS) is used for indicating whether a QM is enabled for pictures in which the SPS has been referenced in picture headers (PHs). When the flag is enabled, that is, sps_scaling_list_enable_flag is enabled, an additional flag in the PH is used for controlling whether to use a default QM of which all elements are equal to 16 or use a user-defined QM. In VTM7, a user-defined QM is notified in an adaptive parameter set (APS). If a user-defined QM is enabled in an SPS and a PH, one APS index may be transmitted in the PH, for specifying a QM set of an image in which the PH has been referenced.

scaling_list_copy_mode_flag[id] being equal to 1 indicates that an element value of a current QM is the same as an element value of a reference QM of the current QM. The reference QM is represented by scaling_list_pred_id_delta[id]. scaling_list_copy_mode_flag[id] being equal to 0 indicates that scaling_list_pred_mode_flag exists.

scaling_list_pred_mode_flag[id] being equal to 1 indicates that the current QM may be predicted from the reference QM. The reference QM is represented by scaling_list_pred_id_delta[id]. scaling_list_pred_mode_flag[id] being equal to 0 indicates that the element value of the current QM is notified by explicitly transmitting a signal. When scaling_list_pred_mode_flag[id] does not exist, a value thereof is deduced to be equal to 0.

scaling_list_pred_id_delta[id] represents a reference QM used for deducing a prediction QM, that is, ScalingMatrixPred[id]. When scaling_list_pred_id_delta[id] does not exist, a value thereof is deduced to be equal to 0. The value of scaling_list_pred_id_delta[id] shall be within a range of 0 to maxIdDelta. maxIdDelta is deduced according to an id, which is shown in Formula 2 below:

$$\text{maxIdDelta}=\text{id}<2?\text{id}((\text{id}<8)?(\text{id}-2):(\text{id}-8)) \quad \text{Formula 2}$$

That is, if id<2, maxIdDelta=id; if id≥2 and id<8, maxIdDelta=id−2; and if id≥8, maxIdDelta=id−8.

Variables refId and matrixSize are calculated by using the following formulas:

$$\text{refId}=\text{id}-\text{scaling\_list\_pred\_id\_delta}[\text{id}] \quad \text{Formula 3}$$

$$\text{matrixSize}=(\text{id}<2)?2:((\text{id}<8)?4:8) \quad \text{Formula 4}$$

That is, if id<2, matrixSize=2; if id≥2 and id<8, matrixSize=4; and if id≥8, matrixSize=8.

A QM prediction matrix of matrixSize×matrixSize is represented as ScalingMatrixPred[x][y], where x∈[0, matrixSize−1], y∈[0, matrixSize−1]; and a variable ScalingMatrixDCPred is represented as a predicted value of DC, which are calculated as follows:

When both scaling_list_copy_mode_flag[id] and scaling_list_pred_mode_flag[id] are equal to 0, all elements of ScalingMatrixPred are set to be equal to 8, and a value of ScalingMatrixDCPred is set to be equal to 8.

Otherwise, when scaling_list_pred_id_delta[id] is equal to 0, all elements of ScalingMatrixPred are set to be equal to 16, and a value of ScalingMatrixDCPred is set to be equal to 16.

Otherwise, when scaling_list_copy_mode_flag[id] or scaling_list_pred_mode_flag[id] is equal to 1, and scaling_list_pred_id_delta[id] is greater than 0, ScalingMatrixPred is set to be equal to ScalingMatrixPred[refId], and a value of ScalingMatrixDCPred is calculated as follows: is refId is greater than 13, a value of ScalingMatrixDCPred is set to be equal to ScalingMatrixDCRec[refId−14]; otherwise, (that is, refId is less than or equal to 13), a value of ScalingMatrixDCPred is set to be equal to ScalingMatrixPred[0][0].

scaling_list_dc_coef[id−14] is used to calculate a value of a variable ScalingMatrixDC[id−14] when an id is greater than 13, which is shown in Formula 5 below:

ScalingMatrixDCRec[id−14]=(ScalingMatrixDCPred+scaling_list_dc_coef[id−14]+256)%256)    Formula 5 where % represents obtaining of a remainder.

When scaling_list_dc_coef[id−14] does not exist, a value thereof is deduced to be equal to 0. The value of scaling_list_dc_coef[id−14] shall be within a range of −128 to 127 (including −128 and 127). The value of ScalingMatrixDCRec[id−14] shall be greater than 0.

A value of ScalingMatrixRec[id][x][y] shall be greater than 0.

A decoding process, that is, a process of performing decoding according to the foregoing syntax elements to obtain ScalingMatrixRec[id][x][y] and ScalingMatrixDCRec, of a QM is considered.

4. A Size of TB is Limited by Using an SPS

In the VVC draft 7, SPS syntax and semantic definitions related to the TB size constraint are shown in Table 5 below:

TABLE 5

| seq_parameter_set_rbsp( ) { | Descriptor |
|---|---|
| ... | |
| chroma_format_idc | u(2) |
| if( chroma_format_idc = = 3 ) | |
|   separate_colour_plane_flag | u(1) |
| ... | |
| sps_log2_ctu_size_minus5 | u(2) |
| ... | |
| sps_max_luma_transform_size_64_flag | u(1) |
| ... | |
| log2_min_luma_coding_block_size_minus2 | ue(v) |
| ... | |
| if( separate_colour_plane_flag = = 1) | |
|   colour_plane_id | u(2) |
| ... | |
| } | | sps_max_luma_transform_size_64_flag being equal to 1 indicates that a size of a maximum TB in luma sampling is equal to 64. sps_max_luma_transform_size_64_flag being equal to 0 indicates that a size of a maximum TB in luma sampling is equal to 32.

chroma_format_idc represents chroma sampling corresponding to luma sampling, which is shown in Table 6 below:

TABLE 6

| chroma_format_idc | separate_colour_plane_flag | Chroma format | Sub Width C | SubHeight C |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 | scaling_list_delta coef[id][i] represents a difference between ScalingList[id][i] and a previous matrix coefficient ScalingList[id][i−1] when scaling_list_copy_mode_flag[id] is equal to 0. The value of scaling_list_delta coef[id][i] shall be within a range of −128 to 127 (including −128 and 127). When scaling_list_copy_mode_flag[id] is equal to 1, all elements of ScalingList[id] are set to be equal to 0.

ScalingMatrixRec[id] of a QM of matrixSize×matrixSize may be calculated by using Formula 6 below:

ScalingMatrixRec[id][x][y]=(ScalingMatrixPred[x][y]+ScalingList[id][k]+256)%256)    Formula 6 where % represents obtaining of a remainder, k∈[0, (matrixSize×matrixSize−1)].

x=DiagScanOrder[Log 2(matrixSize)][Log 2(matrixSize)][k][0], and y=DiagScanOrder[Log 2(matrixSize)][Log 2(matrixSize)][k][1].

In Table 6, SubWidthC and SubHeightC respectively represent a width and a height of a coding tree unit (CTU) corresponding to a chroma component, and Monochrome indicates that there is no chroma component.

separate_colour_plane_flag being equal to 1 indicates that three color components of a 4:4:4 chroma format are separately encoded. separate_colour_plane_flag being equal to 0 indicates that a color component is not separately encoded. When separate_colour_plane_flag does not exist, a value thereof is deduced to be 0.

When separate_colour_plane_flag is equal to 1, an encoded image is formed by three separate components, and each component is formed by encoded samples of a color plane (Y, Cb or Cr), and a monochrome encoding syntax is used. In this case, each color plane is associated with a specified colour_plane_id value.

colour_plane_id specifies a color plane associated with a slice associated with a PH. When separate_colour_plane_flag is equal to 1, a value of colour_plane_id shall be within a range of 0 to 2 (including 0 and 2). Values 0, 1, and 2 of colour_plane_id respectively correspond to the planes Y, Cb, and Cr. There is no dependency between decoding processes of images having different colour_plane_id values.

sps_log 2_ctu_size_minus5 plus 5 represents a luma coding tree block size of each CTU. A value of sps_log 2_ctu_size_minus5 being less than or equal to 2 is a requirement for bitstream consistence.

A maximum luma coding block size may be calculated based on sps_log 2_ctu_size_minus5:

Ctb Log 2SizeY=sps_log 2_ctu_size_minus5+5

CtbSizeY=1<<Ctb Log 2SizeY where CtbSizeY represents the maximum luma coding block size, Ctb Log 2SizeY represents a logarithm of CtbSizeY with 2 as a base, and << is a left shift operator.

log 2_min_luma_coding_block_size_minus2 plus 2 represents a minimum luma coding block size. A value range of log 2_min_luma_coding_block size_minus2 shall be 0 to sps_log 2_ctu_size_minus5+3, including 0 and sps_log 2_ctu_size_minus5+3.

A calculation process of MinCb Log 2SizeY, MinCbSizeY, and VSize are as follows:

MinCb Log 2SizeY=log 2_min_luma_coding_block_size_minus2+2    Formula 7

MinCbSizeY=1<<MinCb Log 2SizeY    Formula 8

VSize=Min(64,CtbSizeY)    Formula 9 where MinCbSizeY represents the minimum luma coding block size, MinCb Log 2SizeY represents a logarithm of MinCbSizeY with 2 as a base, VSize represents the maximum luma coding block size, and << is a left shift operator. A value of MinCbSizeY shall be less than or equal to VSize.

A width and a height of each chroma coding tree block (CTB), that is, variables CtbWidthC and CtbHeightC are determined in the following manner:

If chroma_format ide is equal to 0 (monocolor) or Separate_color_Plane_flag is equal to 1, both CtbWidthC and CtbHeightC are equal to 0.

Otherwise, CtbWidthC and CtbHeightC are calculated by using the formulas below:

CtbWidthC=CtbSizeY/SubWidthC    Formula 10

CtbHeightC=CtbSizeY/SubHeightC    Formula 11 where CtbSizeY represents a size of a luma CTB.

In a method for encoding a QM currently used in VVC, all of 28 QMs are encoded and transmitted in an APS, resulting in that QM signaling needs to occupy a relatively large quantity of codewords, bit overheads are relatively large, and computational complexity of the decoder side is increased. According to embodiments, a first parameter set corresponding to a to-be-decoded video frame is obtained; an effective QM is determined according to syntax elements included in the first parameter set, the effective QM being a QM actually used for quantizing transform coefficients during generation of the to-be-decoded video frame through encoding; and then the effective QM is decoded by the decoder. In this way, an encoder side only encodes and transmits an effective QM, thereby helping reduce codewords that QM signaling needs to occupy and reduce bit overheads; and a decoder side only needs to decode the effective QM, thereby reducing computational complexity of the decoder side.

Technical solutions provided by embodiments may be applied to the H.266/VCC standard, a next generation of video encoding and decoding standard, or other encoding and decoding standard.

In video decoding methods provided in embodiments, an execution entity of the operations is a decoder side device, and in video encoding methods provided in embodiments, an execution entity of the operations is an encoder side device. Both the decoder side device and the encoder side device may be computer devices. The computer device refers to an electronic device having data computation, processing, and storage capabilities, such as a PC, a mobile phone, a tablet computer, a media player, a dedicated video conference device, or a server.

In addition, the methods provided herein may be used alone or combined with other methods in any order. The encoder and decoder based on the methods provided herein may be implemented by one or more processors or one or more integrated circuits. Technical solutions are described below by using several embodiments.

Figure 10:
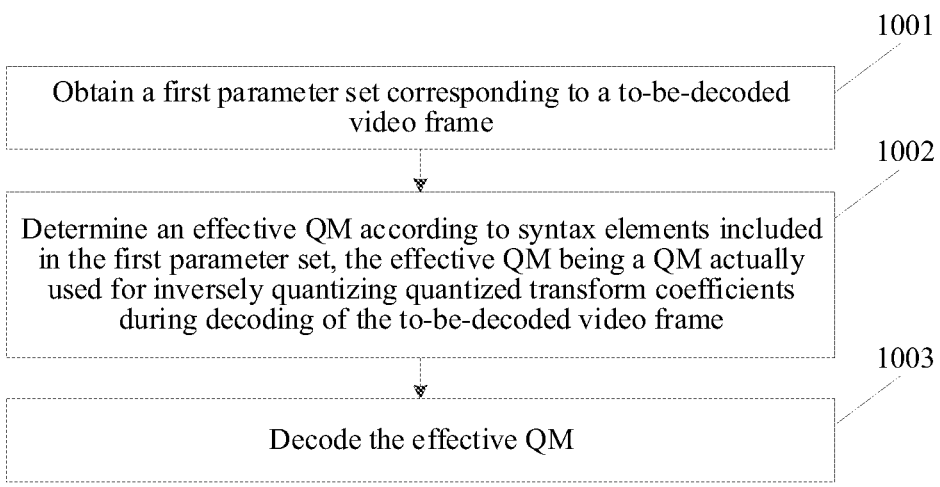
FIG. 10 is a flowchart of a video decoding method according to an embodiment.

FIG. 10 is a flowchart of a video decoding method according to an embodiment. Descriptions are made mainly by using an example in which the method is applied to the decoder side device introduced above. The method may include the following operations (1001 to 1003):

Operation 1001: Obtain a first parameter set corresponding to a to-be-decoded video frame.

The to-be-decoded video frame may be any to-be-decoded video frame (or referred to as an image frame) in a to-be-decoded video. The first parameter set is a parameter set including related syntax elements used for defining a QM. For example, a decoder side device may obtain a QM through decoding according to a syntax element included in the first parameter set.

Optionally, the first parameter set is an APS. In other embodiments, the first parameter set may alternatively not be an APS, and may alternatively be another parameter, such as an SPS.

Operation 1002: Determine an effective QM according to syntax elements included in the first parameter set, the effective QM being a QM actually used for inversely quantizing quantized transform coefficients during decoding of the to-be-decoded video frame.

It is assumed that a quantity of QMs that may be used for inversely quantizing quantized transform coefficients is n, a quantity of the effective QMs may be less than n or equal to n, n being a positive integer. For example, when all of n QMs are actually used for inversely quantizing the quantized transform coefficients, the quantity of the effective QMs is n; and when some QMs (for example, m QMs, m being a positive integer less than n) of all the n QMs are actually used for inversely quantizing the quantized transform coefficients, the quantity of the effective QMs is m.

By defining syntax elements used for determining an effective QM in the first parameter set, the decoder side device may determine which QMs are effective QMs and which QMs are not effective QMs by reading the syntax elements. For a QM that is not an effective QM (which may be referred to as an ineffective QM), that is, a QM that is not actually used for quantizing a transform coefficient during generation of a to-be-decoded video frame through encoding, it may be unnecessary for the decoder side device to decode the QM.

Optionally, for any other QM that is not an effective QM, all elements of the QM are predefined by a default value. For example, the default value may be 16. With reference to Formula 1, because scaling quantization coefficients of all transform coefficients in a TB are 1 in this case, an effect is the same as an effect of not using a QM.

Operation 1003: Decode the effective QM.

After the effective QM is determined, because there may be one or more effective QMs, the decoder side device needs to decode each effective QM separately. Any effective QM is used as an example. When the effective QM is decoded, an encoding mode corresponding to the effective QM may be determined, and then the effective QM is decoded according to the encoding mode.

For example, with reference to Table 1, a quantity of QMs that may be used for quantizing transform coefficients may be 28. It is assumed that it is determined that 12 QMs therein are effective QMs, then the decoder side device only needs to decode the 12 effective QMs, and does not need to decode the other 16 ineffective QMs.

Based on the above, a first parameter set corresponding to a to-be-decoded video frame is obtained; an effective QM is determined according to syntax elements included in the first parameter set, the effective QM being a QM actually used for quantizing transform coefficients during generation of the to-be-decoded video frame through encoding; and then the effective QM is decoded. In this way, a decoder side only needs to decode an effective QM, thereby reducing computational complexity of the decoder side.

In an embodiment, the determining an effective QM according to the syntax elements included in the first parameter set includes the foregoing sub-operations:

1: Determine an effective size range of a QM according to the syntax elements included in the first parameter set.

An effective size range of a QM defines a minimum size and a maximum size of a QM actually used for inversely quantizing a quantized transform coefficient during decoding. In addition, a value of a QM size is an exponential power of 2, such as 2, 4, 8, 16, 32, and 64.

2: Determine a QM falling within the effective size range as the effective QM.

For example, when an effective size range of a QM is [4, 32], effective QMs include a QM with a size of 4×4, a QM with a size of 8×8, a QM with a size of 16×16, and a QM with a size of 32×32. In another example, when an effective size range of a QM is [8, 16], effective QMs include a QM with a size of 8×8 and a QM with a size of 16×16.

For example, it is assumed that a determined effective size range of a QM is [8, 16], then with reference to Table 1 and Table 2, sizeId corresponding to a QM with a size of 8×8 is 3, and sizeId corresponding to a QM with a size of 16×16 is 4. The decoder side device determines that 12 QMs in total with ids of 8 to 19 are effective QMs, and the other 16 QMs with ids of 0 to 7 and 20 to 27 are ineffective QMs.

In an example, an effective size range of a QM is determined according to the syntax elements included in the first parameter set in the following manner:

1.1: Determine a minimum luma coding block size, a block size of a luma coding tree, and a maximum luma TB size according to the syntax elements included in the first parameter set.

Optionally, a first syntax element is defined in the first parameter set, and the first syntax element is used for indicating the minimum luma coding block size; a second syntax element is defined in the first parameter set, and the second syntax element is used for indicating the block size of the luma coding tree; and a third syntax element is defined in the first parameter set, and the third syntax element is used for indicating the maximum luma TB size. The decoder side device reads the first syntax element, the second syntax element, and the third syntax element from the first parameter set, and determines the minimum luma coding block size, the block size of the luma coding tree, and the maximum luma TB size.

1.2: Determine an effective size range of a luma QM according to the minimum luma coding block size, the block size of the luma coding tree, and the maximum luma TB size, the effective size range of the luma QM including a minimum size and a maximum size of the luma QM.

Optionally, the decoder side device determines the minimum size of the luma QM according to the minimum luma coding block size. For example, the minimum luma coding block size is determined as the minimum size of the luma QM. The decoder side device determines a larger value of the block size of the luma coding tree and the maximum luma TB size as the maximum size of the luma QM. For example, when the block size of the luma coding tree is greater than the maximum luma TB size, the block size of the luma coding tree is determined as the maximum size of the luma QM; when the block size of the luma coding tree is less than the maximum luma TB size, the maximum luma TB size is determined as the maximum size of the luma QM; and when the block size of the luma coding tree is equal to the maximum luma TB size, because the two are equal, the block size of the luma coding tree is determined as the maximum size of the luma QM, or the maximum luma TB size is determined as the maximum size of the luma QM, which has the same result.

1.3: Determine an effective size range of a chroma QM according to the effective size range of the luma QM and a sampling rate of a chroma component relative to a luma component, the effective size range of the chroma QM including a minimum size and a maximum size of the chroma QM.

Optionally, a fourth syntax element is defined in the first parameter set, and the fourth syntax element is used for indicating the sampling rate of the chroma component relative to the luma component.

Optionally, the decoder side device calculates the minimum size of the chroma QM according to the minimum size of the luma QM and the sampling rate of the chroma component relative to the luma component; and calculates the maximum size of the chroma QM according to the maximum size of the luma QM and the sampling rate of the chroma component relative to the luma component.

In an embodiment, an example in which the first parameter set is an APS is used. Syntax elements included in the APS and a syntax structure table are shown in Table 7 below:

TABLE 7

| scaling_list_data( ) { | Descriptor |
|---|---|
| scaling_matrix_for_lfnst_disabled_flag | u(1) |
| aps_qm_size_info_present_flag | u(1) |
| if (aps_qm_size_info_present_flag) { | |
| aps_log2_ctu_size_minus5 | u(2) |
| aps_log2min_luma_coding_block_size_minus2 | ue(v) |

TABLE 7-continued

```
scaling_list_data( ) {                                                              Descriptor
    aps_max_luma_transform_size_64_flag                                             u(1)
    aps_chroma_format_idc                                                           u(2)
  }
  for( id = 0; id < 28; id ++ ) {
    matrixSize = (id < 2) ? 2 : ( ( id < 8) ? 4 : 8 )
    if((cIdx==0 && ( matrixQMSize >= minQMSizeY && matrixQMSize <=
maxQMSizeY ). || (cIdx!=0 && ( matrixQMSize >= minQMSizeUV &&
matrixQMSize <= maxQMSizeUV )) {
      scaling_list_copy_mode_flag[ id ]                                             u(1)
      if( !scaling_list_copy_mode_flag[ id ] )
        scaling_list_pred_mode_flag[ id ]                                           u(1)
      if( ( scaling_list_copy_mode_flag[ id ] | | scaling_list_pred_mode_flag [ id ] )
&&
          id != 0&& id != 2&& id != 8)
        scaling_list_pred_id_delta[ id ]                                            ue(v)
      if( !scaling_list_copy_mode_flag[ id ] ) {
        nextCoef = 0
        if( id > 13 ) {
          scaling_list_dc_coef[ id − 14 ]                                           se(v)
          nextCoef += scaling_list_dc_coef[ id − 14 ]
        }
        for( i = 0; i < matrixSize * matrixSize; i++ ) {
          x = DiagScanOrder[ 3 ][ 3 ][ i ][ 0 ]
          y = DiagScanOrder[ 3 ][ 3 ][ i ][ 1 ]
          if( !( id > 25 && x >= 4 && y >= 4 ) ) 1
            scaling_list_delta_coef[ id ][ i ]                                      se(v)
            nextCoef += scaling_list_delta_coef[ id ][ i ]
        }
        ScalingList[ id ][ i ] = nextCoef
      }
    }
  }
}
``` aps_qm_size_info_present_flag indicates whether a syntax element related to a QM size exists in a bitstream. A value of aps_qm_size_info_present_flag being 1 indicates that a syntax element related to a QM size appears in the bitstream, and an effective size range of a QM may be determined based on this, to determine a QM of which size needs to be decoded. A value of aps_qm_size_info_present_flag being 0 indicates that no syntax element related to a QM size exists in the bitstream, and QMs of all sizes need to be decoded.

A value of aps_log 2_ctu_size_minus5 plus 5 indicates the block size of the luma coding tree. The value thereof is specified to be the same as a value of a syntax element sps_log 2_ctu_size_minus5.

A value of aps_log 2_min_luma coding_block_size_minus2 plus 2 indicates the minimum luma coding block size. The value thereof is specified to be the same as a value of a syntax element sps_log 2_min_luma_coding_block size_minus2.

A value of aps_max_luma_transform_size_64_flag being 1 indicates that the maximum luma TB size is 64; and the value being 0 indicates that the maximum luma TB size is 32. The value thereof is specified to be the same as a value of a syntax element sps_max_luma_transform_size_64_flag.

aps_chroma_format_idc indicates the sampling rate of the chroma component relative to the luma component, which is specifically shown in Table 6. The value thereof is specified to be the same as a value of a syntax element chroma_format_idc.

Based on the foregoing syntax element, a deduction process of variables minQMSizeY (representing the minimum size of the luma QM) and maxQMSizeY (representing the maximum size of the luma QM) is as follows:

When a value of a syntax element aps_qm_size_info_present_flag is 1, $$\text{minQMSizeY}=1<<(\text{aps\_log 2\_min\_luma coding\_block\_size\_minus2}+2) \quad \text{Formula 12}$$

$$\text{maxQMSizeY}=\max(1<<(\text{aps\_log 2\_ctu\_size\_minus5}+5), \text{aps\_max\_luma\_transform\_size\_64\_flag}?64:32) \quad \text{Formula 13}$$

where << is a left shift operator, and ?: is a ternary condition operator.

When a value of a syntax element aps_qm_size_info_present_flag is 0,
  minQMSizeY=4;
  maxQMSizeY=64.

A deduction process of variables minQMSizeUV (the minimum size of the chroma QM) and maxQMSizeUV (the maximum size of the chroma QM) is as follows:

When a value of a syntax element aps_qm_size_info_present_flag is 1, $$\text{minQMSizeUV}=(!\text{aps\_chroma\_format\_idc})?0: \text{minQMSizeY/SubWidthC} \quad \text{Formula 14}$$

$$\text{maxQMSizeUV}=(!\text{aps\_chroma\_format\_idc})?0: \text{maxQMSizeY/SubHeightC} \quad \text{Formula 15}$$

where ! represents a logical not operation, and ?: is a ternary condition operator.

The definitions of Formula 14 and Formula 15 are as follows:

If aps_chroma_format_idc does not exist, minQMSizeUV=0; otherwise, minQMSizeUV=minQMSizeY/SubWidthC; and if aps_chroma_format_idc does not exist, maxQMSizeUV=0; otherwise, maxQMSizeUV=maxQMSizeY/SubHeightC.

When a value of a syntax element aps_qm_size_info_present_flag is 0,
   minQMSizeUV=2;
   maxQMSizeUV=32.

In the syntax structure table shown in Table 7, the variable cIdx represents a color component corresponding to a current QM. For a luma component Y, a value thereof is 0; for a chroma Cb, a value thereof is 1; and for a chroma Cr, a value thereof is 2. The variable matrixSize represents an actual encoding size of the current QM, which is indicated by the third column in Table 2. The variable matrixQMSize represents a TB size corresponding to the current QM, which is indicated by Table 1 and Table 2.

In the syntax structure table shown in Table 7, the decoder side device first determines two conditions proposed in this application, and then decides whether to decode the current QM. An example of determining whether the first QM is an effective QM is used (the first QM may be any available QM, that is, any one of all the foregoing 28 QMs). If the first QM meets one of a first condition and a second condition, it is determined that the first QM is an effective QM.

The first condition is cIdx==0 && (matrixQMSize>=minQMSizeY) && matrixQMSize<=maxQMSizeY), and indicates that the first QM is a luma component and is used in a quantization process of a luma TB. The first QM is within the effective size range [MinQMSizeY, MaxQMSizeY] of the luma QM, MinQMSizeY representing the minimum size of the luma QM, and MaxQMSizeY representing the maximum size of the luma QM. The second condition is cIdx!=0 && (matrixQMSize>=minQMSizeUV) && matrixQMSize<=maxQMSizeUV), and indicates that the first QM is a chroma component and is used in a quantization process of a chroma TB. The first QM is within the effective size range [MinQMSizeUV MaxQMSizeUV] of the chroma QM, MinQMSizeUV representing the minimum size of the chroma QM, and MaxQMSizeUV representing the maximum size of the chroma QM.

In the foregoing example, the decoder side device needs to calculate the effective size range of the QM based on the syntax elements included in the first parameter set, and then determines the effective QM according to the effective size range. In an example described below, a syntax element of the effective size range of the luma QM may alternatively be directly defined in the first parameter set. After reading the syntax element, the decoder side device may directly obtain the effective size range of the luma QM, and then determine the effective size range of the chroma QM according to the effective size range of the luma QM with reference to the chroma format. Details are as follows:

In another example, the effective size range of the QM is determined according to the syntax elements included in the first parameter set in the following manner:

1.1: Determine an effective size range of a luma QM according to the syntax elements included in the first parameter set, the effective size range of the luma QM including a minimum size and a maximum size of the luma QM.

Optionally, a fifth syntax element is defined in the first parameter set, and the fifth syntax element is used for indicating a minimum size of the luma QM; and a sixth syntax element is defined in the APS, and the sixth syntax element is used for indicating the maximum size of the luma QM. The decoder side device reads the fifth syntax element and the sixth syntax element from the first parameter set, to determine the minimum size and the maximum size of the luma QM.

1.2: Determine an effective size range of a chroma QM according to the effective size range of the luma QM and a sampling rate of a chroma component relative to a luma component, the effective size range of the chroma QM including a minimum size and a maximum size of the chroma QM.

Optionally, a fourth syntax element is defined in the first parameter set, and the fourth syntax element is used for indicating the sampling rate of the chroma component relative to the luma component.

Optionally, the decoder side device calculates the minimum size of the chroma QM according to the minimum size of the luma QM and the sampling rate of the chroma component relative to the luma component; and calculates the maximum size of the chroma QM according to the maximum size of the luma QM and the sampling rate of the chroma component relative to the luma component.

In an embodiment, an example in which the first parameter set is an APS is used. Syntax elements included in the APS and a syntax structure table are shown in Table 8 below:

TABLE 8

| scaling_list_data( ) { | Descriptor |
|---|---|
|   scaling_matrix_for_lfnst_disabled_flag | u(1) |
|   aps_qm_size_info_present_flag | u(1) |
|   if (aps_qm_size_info_present_flag) { | |
|     aps_log2_min_luma_qm_size_minus2 | ue(v) |
|     aps_log2_max_luma_qm_size_minus5 | ue(v) |
|     aps_chroma_format_idc | ue(v) |
|   } | |
|   for( id = 0; id < 28; id ++ ) { | |
|     matrixSize = (id < 2 ) ? 2 : ( ( id < 8 ) ? 4 : 8 ) | |
|     if((cIdx==0 && ( matrixQMSize >= minQMSizeY && matrixQMSize <= maxQMSizeY ). || (cIdx!=0 && ( matrixQMSize >= minQMSizeUV && matrixQMSize <= maxQMSizeUV )) { | |
|       scaling_list_copy_mode_flag[ id ] | u(1) |
|       if( !scaling_list_copy_mode_flag[ id ] ) | |
|       scaling_list_pred_mode_flag[ id ] | u(1) |
|       if( ( scaling_list_copy_mode_flag[ id ] || scaling_list_pred_mode_flag [ id ] ) && | |
|         id != 0&& id != 2&& id != 8) | |
|       scaling_list_pred_id_delta[ id ] | ue(v) |
|       if( !scaling_list_copy_mode_flag[ id ] ) { | |
|         nextCoef = 0 | |
|         if( id > 13 ) { | |

TABLE 8-continued

```
scaling_list_data( ) {                                                    Descriptor
            scaling_list_dc_coef[ id − 14 ]                               se(v)
            nextCoef += scaling_list_dc_coef[]id − 14 ]
         }
         for( i = 0; i < matrixSize * matrixSize; i++ ) {
            x = DiagScanOrder[ 3 ][ 3 ][ i ][ 0 ]
            y = DiagScanOrder[ 3 ][ 3 ][ i ][ 1 ]
            if( !( id > 25 && x >= 4 && y >= 4 ) ) {
               scaling_list_delta_coef[ id ][ i ]                         se(v)
               nextCoef += scaling_list_delta_coef[ id ][ i ]
            }
            ScalingList[ id ][ i ] = nextCoef
         }
      }
   }
}
``` aps_qm_size_info_present_flag indicates whether a syntax element related to a QM size exists in a bitstream. A value of aps_qm_size_info_present_flag being 1 indicates that a syntax element related to a QM size appears in the bitstream, and the effective size range of a QM may be determined based on this, to determine a QM of which size needs to be decoded. A value of aps_qm_size_info_present_flag being 0 indicates that no syntax element related to a QM size exists in the bitstream, and QMs of all sizes need to be decoded.

A value of aps_log 2_min_luma_qm_size_minus2 plus 2 indicates the minimum size of the luma QM.

A value of aps_log 2_max_luma_qm_size_minus5 plus 5 indicates the maximum size of the luma QM.

Based on the above syntax elements, a deduction process of the variables minQMSizeY (representing the minimum size of the luma QM) and maxQMSizeY (representing the maximum size of the luma QM) is as follows:

When a value of a syntax element aps_qm_size_info_present_flag is 1, $$\text{minQMSizeY}=1<<(\text{aps\_log 2\_min\_luma\_qm\_size\_minus2}+2) \quad \text{Formula 16}$$

$$\text{maxQMSizeY}=1<<(\text{aps\_log 2\_max\_luma\_qm\_size\_minus5}+5) \quad \text{Formula 17}$$

where << is a left shift operator.

When a value of aps_qm_size_info_present_flag is 1, minQMSizeY maxQMSizeY are specified to be respectively the same as a TB size variable MinCbSizeY calculated based on an SPS syntax element and a value of VSize.

When a value of a syntax element aps_qm_size_info_present_flag is 0,
   minQMSizeY=4;
   maxQMSizeY=64.

aps_chroma_format_idc indicates the sampling rate of the chroma component relative to the luma component, which is specifically shown in Table 6. The value thereof is specified to be the same as a value of a syntax element chroma_format_idc.

A deduction process of variables minQMSizeUV (the minimum size of the chroma QM) and maxQMSizeUV (the maximum size of the chroma QM) is as follows:

When a value of a syntax element aps_qm_size_info_present_flag is 1, $$\text{minQMSizeUV}=(!\text{aps\_chroma\_format\_idc})?0:\text{minQMSizeY/SubWidthC} \quad \text{Formula 18}$$

$$\text{maxQMSizeUV}=(!\text{aps\_chroma\_format\_idc})?0:\text{maxQMSizeY/SubHeightC} \quad \text{Formula 19}$$

where ! represents a logical not operation, and ?: is a ternary condition operator.

When a value of a syntax element aps_qm_size_info_present_flag is 0,
   minQMSizeUV=2;
   maxQMSizeUV=32.

In some other examples, the decoder side device may alternatively determine the effective QM according to syntax elements included in an SPS. Specifically, the decoder side device may calculate an effective size range [MinQMSizeY, MaxQMSizeY] of the luma QM and an effective size range [MinQMSizeUV, MaxQMSizeUV] of the chroma QM according to the syntax elements included in the SPS. A variable MinQMSizeY represents the minimum size of the luma QM, a variable MaxQMSizeY represents the maximum size of the luma QM, a variable MinQMSizeUV represents the minimum size of the chroma QM, and a variable MaxQMSizeUV represents the maximum size of the chroma QM.

With reference to an SPS syntax structure table shown in Table 5, the foregoing variables may be calculated by using the following formulas:

$$\text{MinQMSizeY}=1<<(\log 2\_\text{min\_luma coding\_block\_size\_minus2}+2) \quad \text{Formula 20}$$

$$\text{MaxQMSizeY}=\max(1<<(\text{sps\_log 2\_ctu\_size\_minus5}+5),\ \text{sps\_max\_luma\_transform\_size\_64\_flag?64:32}) \quad \text{Formula 21}$$

$$\text{MinQMSizeUV}=(!\text{chroma\_format\_idc})?0:\text{MinQMSizeY/SubWidthC} \quad \text{Formula 22}$$

$$\text{MaxQMSizeUV}=(!\text{chroma\_format\_idc})?0:\text{MaxQMSizeY/SubHeightC} \quad \text{Formula 23}$$

where << is a left shift operator, ! represents a logical not operation, and ?: is a ternary condition operator.

Compared with determining an effective QM according to the syntax elements included in the SPS, by defining related syntax elements in the APS, and determining an effective QM according to the related syntax elements defined in the APS, parsing dependency between the APS and the SPS bitstreams may be eliminated, so that decoding of the APS does not need to depend on the syntax elements of the SPS.

In an embodiment, the determining an effective QM according to the syntax elements included in the first parameter set includes the foregoing sub-operations:

1) reading a value of a flag syntax element corresponding to a first QM from the first parameter set;

2) determining, in a case that the value of the flag syntax element corresponding to the first QM is a first value, that the first QM is the effective QM; and 3) determining, in a case that the value of the flag syntax element corresponding to the first QM is a second value, that the first QM is not the effective QM.

In this embodiment, a flag syntax element is defined in the APS, and whether a QM is the effective QM is indicated by the flag syntax element. A descriptor of the flag syntax element may be u(1), which represents a 1-bit unsigned integer. For example, a value of the flag syntax element being 1 indicates that the QM is the effective QM and needs to be decoded; and the value of the flag syntax element being 0 indicates that the QM is not the effective QM, and does not need to be decoded. For a QM that is not decoded, all elements of the QM are predefined by a default value. Optionally, the default value is 16. With reference to Formula 1, because scaling quantization coefficients of all transform coefficients in a TB are 1 in this case, an effect is the same as an effect of not using a QM.

In addition, the first QM may be any available QM, that is, any one of all the foregoing 28 QMs.

Optionally, the first parameter set is an APS. Certainly, in some other embodiments, the first parameter set may alternatively not be an APS. The first parameter is not limited thereto, and may vary according to embodiments.

In an embodiment, an example in which the first parameter set is an APS is used. Syntax elements included in the APS and a syntax structure table are shown in Table 9 below:

TABLE 9

| scaling_list_data( ) { | Descriptor |
|---|---|
|   scaling_matrix_for_lfnst_disabled_flag | u(1) |
|   for( id = 0; id < 28; id ++ ) { | |
|     matrixSize = (id < 2) ? 2 : ( ( id < 8) ? 4 : 8 ) | |
|     scaling_matrix_present_flag[ id ] | u(1) |
|     if( scaling_matrix_present flag[ id ] ) { | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] \|\| scaling_list_pred_mode_flag [ id ] ) && | |
|         id != 0&& id != 2&& id != 8) | |
|         scaling_list_pred_id_delta[ id ] | ue(v) |
|     if( !scaling_list_copy_mode_flag[ id ]) { | |
|       nextCoef = 0 | |
|       if( id > 13 ) { | |
|         scaling_list_dc_coef[ id − 14 ] | se(v) |
|         nextCoef += scaling_list_dc_coef[ id − 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef[ id ][ i ] | se(v) |
|           nextCoef += scaling_list_delta_coef[ id ][ i ] | |
|         } | |
|         ScalingList[ id ][ i ] = nextCoef | |
|       } | |
|     } | |
|   } | |
|   } | |
| } | |

Optionally, the flag syntax element is scaling_matrix_present_flag. A value of scaling_matrix_present_flag[id] being 1 indicates that the current QM needs to be decoded; and the value of scaling_matrix_present_flag[id] being 0 indicates that the current QM does not need to be decoded, and the decoder side device may deduce that all elements of the QM are 16.

Optionally, a luma QM corresponds to one flag syntax element, which indicates whether the luma QM needs to be decoded. A first chroma QM (a QM corresponding to Cb) and a second chroma QM (a QM corresponding to Cr) with the same prediction mode and the same size share the same flag syntax element, which indicates whether the first chroma QM and the second chroma QM need to be decoded. That is, it is unnecessary to separately use a flag syntax element for the first chroma QM and the second chroma QM, which facilitates further reducing bit overheads of QM encoding signaling.

In an embodiment, an example in which the first parameter set is an APS is used. Syntax elements included in the APS and a syntax structure table are shown in Table 10 below:

TABLE 10

| scaling_list_data( ) { | Descriptor |
|---|---|
|     scaling_matrix_for_lfnst_disabled_flag | u(1) |
|     for( id = 0; id < 28; id ++ ) 1 | |
|       matrixSize = (id < 2) ? 2 : ( ( id < 8) ? 4 : 8 ) | |
|       if( cIdx <= 1 ) | |
|     scaling_matrix_present_flag[ predMode != MODE_INTRA ][ cIdx != 0 ][ sizeId ] | u(1) |
|   if(scaling matrix_present_flag[ predMode != MODE_INTRA ][ cIdx != 0 ][ sizeId ]) { | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] | | scaling_list_pred_mode_flag [ id ] ) && | |
|         id != 0&& id != 2&& id != 8) | |
|       scaling_list_pred_id_delta[ id ] | ue(v) |
|       if( !scaling_list_copy_mode_flag[ id ] ) { | |
|         nextCoef = 0 | |
|         if( id > 13 ) { | |
|           scaling_list_dc_coef[ id − 14 ] | se(v) |
|           nextCoef += scaling_list_dc_coef[ id − 14 ] | |
|         } | |
|         for( i = 0; i < matrixSize * matrixSize; i++ ) { | |
|           x = DiagScanOrder[ 3 ][ 3 ][ i ][ 0 ] | |
|           y = DiagScanOrder[ 3 ][ 3 ][ i ][ 1 ] | |
|           if( !( id > 25 && x >= 4 && y >= 4 ) ) { | |
|             scaling_list_delta_coef[ id ][ i ] | se(v) |
|             nextCoef += scaling_list_delta_coef[ id ][ i ] | |
|           } | |
|           ScalingList[ id ][ i ] = nextCoef | |
|         } | |
|       } | |
|     } | |
|   } | |
| } | |

In a case that a value of scaling_matrix_present flag [predMode !=MODE_INTRA][cIdx !=0][sizeId] is 1, when it is decoded into a luma QM, it indicates that the luma QM is encoded in an APS; and when it is decoded into a chroma QM, it represents QMs corresponding to the chroma Cb and the chroma Cr that have an encoding prediction mode of predMode in the APS and have the same size. When a value of the syntax element is 0, it indicates that the luma QM or the two chroma QMs do not need to be decoded, and the decoder side device may deduce that elements thereof are all 16.

The encoder side device may determine values of flag syntax elements corresponding to the QMs are determined, that is, determine which QMs need to be encoded and which QMs do not need to be executed, according to sizes of the QMs, or according to encoding prediction modes corresponding to the QMs, or according to YUV color components corresponding to the QMs, or comprehensive consideration may be performed with reference to a plurality of elements in the sizes, the encoding prediction modes, and the YUV color components of the QMs. Embodiments are not limited thereto.

In this embodiment, a flag syntax element is defined in the first parameter set, and whether a QM is an effective QM is indicated by the flag syntax element, so that whether QMs need to be decoded may be indicated more flexibly.

Figure 11:
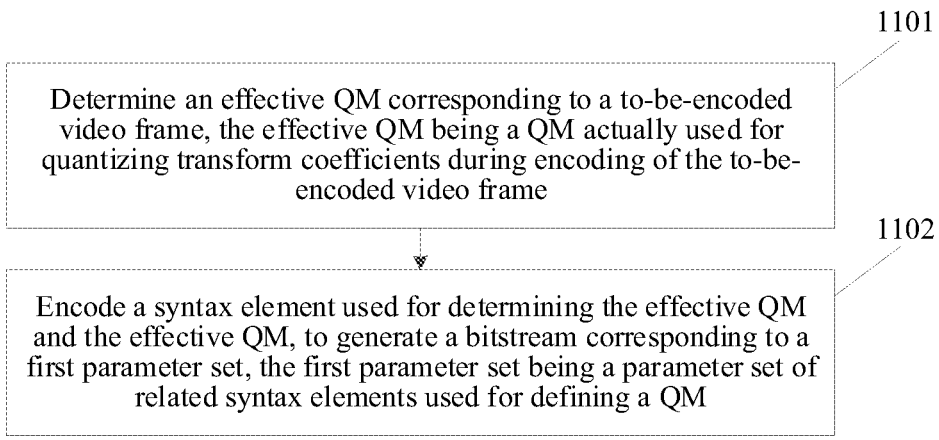
FIG. 11 is a flowchart of a video encoding method according to an embodiment.

FIG. 11 is a flowchart of a video encoding method according to an embodiment. In this embodiment, descriptions are made mainly by using an example in which the method is applied to the encoder side introduced above. The method may include the following operations (1101 to 1102):

Operation 1101: Determine an effective QM corresponding to a to-be-encoded video frame, the effective QM being a QM actually used for quantizing transform coefficients during encoding of the to-be-encoded video frame.

The to-be-encoded video frame may be any video frame (or referred to as an image frame) to be encoded in a to-be-encoded video.

It is assumed that a quantity of QMs that may be used for quantizing transform coefficients is n, a quantity of the effective QMs may be less than n, or may be equal to n, n being a positive integer. For example, when all the n QMs are actually used for quantizing the transform coefficients, the quantity of the effective QMs is n; and when some QMs (for example, m QMs, m being a positive integer less than n) in the all n QMs that are actually used for quantizing the transform coefficients, the quantity of the effective QMs is m.

Optionally, for any other QM that is not an effective QM, all elements of the QM are predefined by a default value. For example, the default value may be 16. With reference to Formula 1, because scaling quantization coefficients of all transform coefficients in a TB are 1 in this case, an effect is the same as an effect of not using a QM.

Operation 1102: Encode a syntax element used for determining the effective QM and the effective QM, to generate a bitstream corresponding to a first parameter set, the first parameter set being a parameter set including related syntax elements used for defining a QM.

After the effective QM is determined, because there may be one or more effective QMs, the encoder side needs to separately encode each effective QM. Any effective QM is used as an example. When the effective QM is encoded, an optimal mode corresponding to the effective QM may be determined, and then the effective QM is encoded according to the optimal mode. The optimal mode may be a mode with a lowest bit cost selected from the three candidate modes described above: the copy mode of the inter-frame prediction mode, the prediction mode of the inter-frame prediction mode, and the intra-frame prediction mode.

For example, with reference to Table 1, the quantity of QMs that may be used for quantizing the transform coefficients may be 28. It is assumed 12 QMs are determined as effective QMs, then the encoder side device only need to encode the 12 effective QMs, and does not need to encode the other 16 ineffective QMs.

Besides, in addition to encoding the effective QMs, the encoder side device also needs to encode a syntax element used for determining an effective QM, so that the decoder side device determines an effective QM according to the syntax element. The encoder side device encodes a syntax element used for determining the effective QM and the effective QM, to generate a bitstream corresponding to a first parameter set. The first parameter set may be an APS, or may be another parameter set of related syntax elements used for defining a QM. This is provided as an example, and embodiments are not limited thereto.

Based on the above, in the technical solution provided in this embodiment, an effective QM corresponding to a to-be-encoded video frame is determined, the effective QM being a QM actually used for quantizing transform coefficients during encoding of the to-be-encoded video frame; and then a syntax element used for determining the effective QM and the effective QM are encoded, to generate a bitstream corresponding to a first parameter set. In this way, an encoder side only encodes and transmits an effective QM, thereby helping reduce codewords that QM signaling needs to occupy and reduce bit overheads; and a decoder side only needs to decode the effective QM, thereby reducing computational complexity of the decoder side.

In addition, an encoding process of the encoder side device corresponds to a decoding process of the decoder side device. For details of the encoding process that are not described in detail, reference may be made to the foregoing descriptions related to the decoding process embodiments, and details are not described herein again.

Apparatus embodiments are described below, which may be used for performing the method embodiments. For details not disclosed in the apparatus embodiment, reference may be made to the method embodiments.

Figure 12:
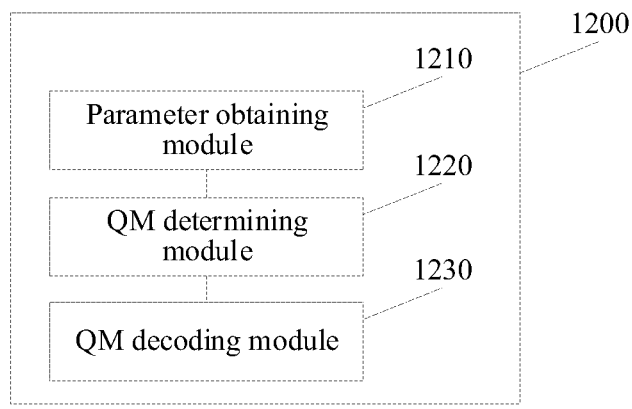
FIG. 12 is a block diagram of a video decoding apparatus according to an embodiment.

FIG. 12 is a block diagram of a video decoding apparatus according to an embodiment. The apparatus has a function of realizing the example of the foregoing video decoding method, and the function may be realized by hardware or by hardware executing corresponding software. The apparatus may be the decoder side device described above, or may be disposed on the decoder side device. The apparatus 1200 may include: a parameter obtaining module 1210, a QM determining module 1220, and a QM decoding module 1230.

The parameter obtaining module 1210 is configured to obtain a first parameter set corresponding to a to-be-decoded video frame, the first parameter set being a parameter set of related syntax elements used for defining a QM.

The QM determining module 1220 is configured to determine an effective QM according to the syntax elements included in the first parameter set, the effective QM being a QM actually used for inversely quantizing quantized transform coefficients during decoding of the to-be-decoded video frame.

The QM decoding module 1230 is configured to decode the effective QM.

Figure 13:
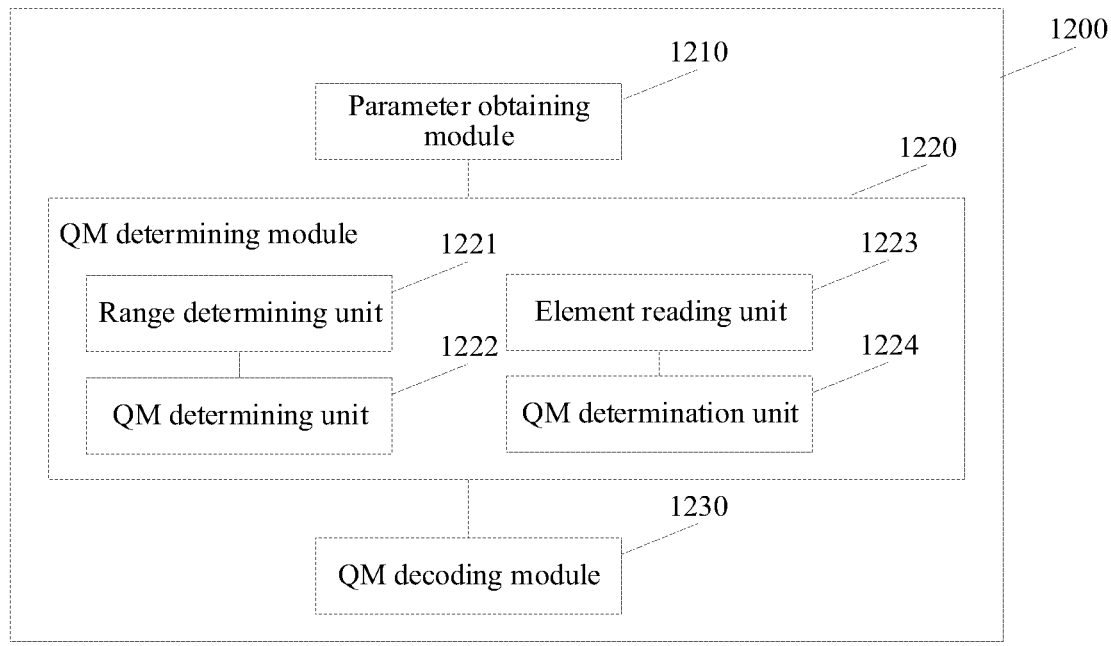
FIG. 13 is a block diagram of a video decoding apparatus according to another embodiment.

In an embodiment, as shown in FIG. 13, the QM determining module 1220 includes: a range determining unit 1221 and a QM determining unit 1222.

The range determining unit 1221 is configured to determine an effective size range of a QM according to the syntax elements included in the first parameter set.

The QM determining unit 1222 is configured to determine a QM falling within the effective size range as the effective QM.

In an embodiment, the range determining unit 1221 is configured to:

determine a minimum luma coding block size, a block size of a luma coding tree, and a maximum luma TB size according to the syntax elements included in the first parameter set;

determine an effective size range of a luma QM according to the minimum luma coding block size, the block size of the luma coding tree, and the maximum luma TB size, the effective size range of the luma QM including a minimum size and a maximum size of the luma QM; and determine an effective size range of a chroma QM according to the effective size range of the luma QM and a sampling rate of a chroma component relative to a luma component, the effective size range of the chroma QM including a minimum size and a maximum size of the chroma QM.

In an embodiment, the range determining unit 1221 is configured to:

determine the minimum size of the luma QM according to the minimum luma coding block size; and determine a larger value of the block size of the luma coding tree and the maximum luma TB size as the maximum size of the luma QM.

In an embodiment, the range determining unit 1221 is configured to:

determine an effective size range of a luma QM according to the syntax elements included in the first parameter set, the effective size range of the luma QM including a minimum size and a maximum size of the luma QM; and determine an effective size range of a chroma QM according to the effective size range of the luma QM and a sampling rate of a chroma component relative to a luma component, the effective size range of the chroma QM including a minimum size and a maximum size of the chroma QM.

In an embodiment, the range determining unit 1221 is configured to:

calculate the minimum size of the chroma QM according to the minimum size of the luma QM and the sampling rate of the chroma component relative to the luma component; and calculate the maximum size of the chroma QM according to the maximum size of the luma QM and the sampling rate of the chroma component relative to the luma component.

In an embodiment, the QM determining unit 1222 is configured to:

determine a first QM as the effective QM in a case that the first QM meets one of a first condition and a second condition, the first condition being cIdx==0 && (matrixQMSize>=minQMSizeY) && matrixQMSize<=maxQMSizeY), and indicating that the first QM is a luma component and is used in a quantization process of a luma TB, the first QM being within the effective size range [MinQMSizeY, MaxQMSizeY] of the luma QM, MinQMSizeY representing the minimum size of the luma QM, and MaxQMSizeY representing the maximum size of the luma QM; and the second condition being cIdx!=0 && (matrixQMSize>=minQMSizeUV && matrixQMSize<=maxQMSizeUV), and indicating that the first QM is a chroma component and is used in a quantization process of a chroma TB, the first QM being within the effective size range [MinQMSizeUV, MaxQMSizeUV] of the chroma QM, MinQMSizeUV representing the minimum size of the chroma QM, and MaxQMSizeUV representing the maximum size of the chroma QM.

In an embodiment, as shown in FIG. 13, the QM determining module 1220 includes: an element reading unit 1223 and a QM determination unit 1224.

The element reading unit 1223 is configured to read a value of a flag syntax element corresponding to a first QM from the first parameter set.

The QM determination unit 1224 is configured to: determine, in a case that the value of the flag syntax element corresponding to the first QM is a first value, that the first QM is the effective QM; and determine, in a case that the value of the flag syntax element corresponding to the first QM is a second value, that the first QM is not the effective QM.

In an embodiment, a first chroma QM and a second chroma QM with the same prediction mode and the same size share the same flag syntax element.

In an embodiment, the flag syntax element is scaling_matrix_present_flag.

In an embodiment, the first parameter set is an APS.

In an embodiment, for any other QM that is not the effective QM, all elements of the QM are predefined by a default value.

In an embodiment, the default value is 16.

Based on the above, in the technical solution provided in this embodiment, a first parameter set corresponding to a to-be-decoded video frame is obtained; an effective QM is determined according to syntax elements included in the first parameter set, the effective QM being a QM actually used for quantizing transform coefficients during generation of the to-be-decoded video frame through encoding; and then the effective QM is decoded. In this way, a decoder side only needs to decode an effective QM, thereby reducing computational complexity of the decoder side.

Figure 14:
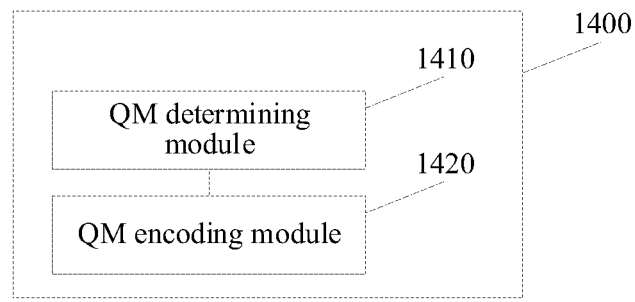
FIG. 14 is a block diagram of a video encoding apparatus according to an embodiment.

FIG. 14 is a block diagram of a video encoding apparatus according to an embodiment. The apparatus has a function of realizing the example of the foregoing video encoding method, and the function may be realized by hardware or by hardware executing corresponding software. The apparatus may be the encoder side device described above, or may be disposed on the encoder side device. The apparatus 1400 may include: a QM determining module 1410 and a QM encoding module 1420.

The QM determining module 1410 is configured to determine an effective QM corresponding to a to-be-encoded video frame, the effective QM being a QM actually used for quantizing transform coefficients during encoding of the to-be-encoded video frame.

The QM encoding module 1420 is configured to encode a syntax element used for determining the effective QM and the effective QM, to generate a bitstream corresponding to a first parameter set, the first parameter set being a parameter set of related syntax elements used for defining a QM.

Based on the above, an effective QM corresponding to a to-be-encoded video frame is determined, the effective QM being a QM actually used for quantizing transform coefficients during encoding of the to-be-encoded video frame; and then a syntax element used for determining the effective QM and the effective QM are encoded, to generate a bitstream corresponding to a first parameter set. In this way, an encoder side only encodes and transmits an effective QM, thereby helping reduce codewords that QM signaling needs to occupy and reduce bit overheads; and a decoder side only needs to decode the effective QM, thereby reducing computational complexity of the decoder side.

When the apparatus provided in the foregoing embodiments implements functions of the apparatus, the division of the foregoing functional modules is provided as an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 15:
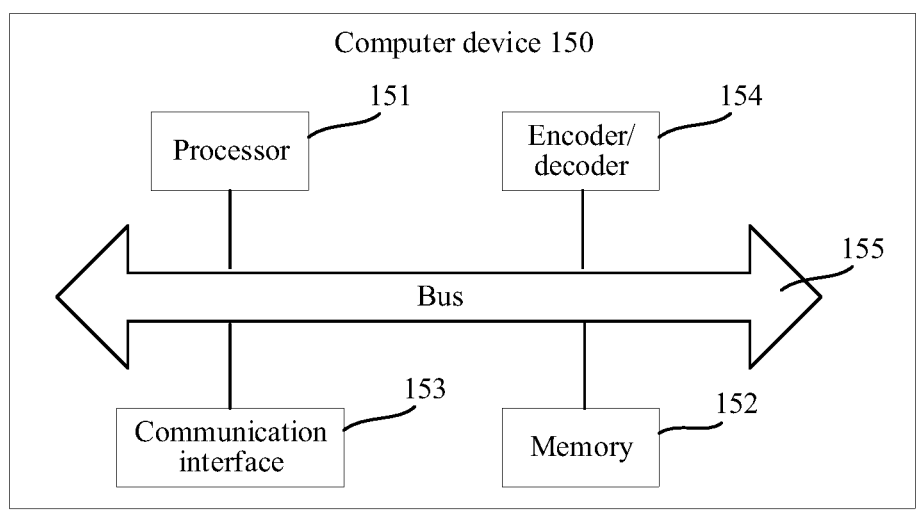
FIG. 15 is a structural block diagram of a computer device according to an embodiment.

FIG. 15 is a schematic block diagram of a computer device according to an embodiment. The computer device may be the encoder side device described above, or may be the decoder side device described above. The computer device 150 may include a processor 151, a memory 152, a communication interface 153, an encoder/decoder 154, and a bus 155.

The processor 151 includes one or more processing cores, and the processor 151 performs various functional applications and information processing by running a software program and module.

The memory 152 may be configured to store a computer program. The processor 151 is configured to execute the computer program, to implement the foregoing video encoding method, or implement the foregoing video decoding method.

The communication interface 153 may be configured to communicate with other devices, for example, receiving/transmitting audio and video data.

The encoder/decoder 154 may be configured to implement encoding and decoding functions, for example, encoding and decoding audio and video data.

The memory 152 is connected to the processor 151 through the bus 155.

In addition, the memory 152 may be implemented by any type of volatile or non-volatile storage device or a combination thereof. The volatile or non-volatile storage device includes, but not limited to: a magnetic disk, an optical disc, an electrically-erasable programmable read-only memory (EEPROM), an erasable programmable read-only memory (EPROM), a static random access memory (SRAM), a read only memory (ROM), a magnetic memory, a flash memory, or a programmable read-only memory (PROM).

A person skilled in the art may understand that the structure shown in FIG. 15 does not constitute any limitation on the computer device 150, and the computer device may include more components or fewer components than those shown in the figure, or some components may be combined, or a different component deployment may be used.

In an embodiment, a computer-readable storage medium is further provided, storing at least one instruction, at least one program, a code set, or an instruction set, the at least one instruction, the at least one program, the code set, or the instruction set, when executed by a processor, implementing the foregoing video decoding method, or implement the foregoing video encoding method. The computer-readable storage medium may be non-transitory.

In an embodiment, a computer program product is further provided, the computer program product, when executed by a processor, being configured to implement the foregoing video decoding method, or implement the foregoing video encoding method.

A plurality of mentioned in the specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

While embodiments have been particularly shown and described, it will be understood that various changes in form and detail may be made therein without departing from the spirit and scope of the following claims.

What is claimed is:

1. A video decoding method, performed by at least one processor, the video decoding method comprising:
   obtaining a first parameter set corresponding to a to-be-decoded video frame, the first parameter set comprising related syntax elements used for defining a quantization matrix (QM);
   determining an effective QM according to a first flag syntax element comprised in the first parameter set, wherein the first flag syntax element is configured to indicate whether a chroma QM needs to be decoded, and wherein the effective QM is a QM actually used for inversely quantizing quantized transform coefficients during decoding of the to-be-decoded video frame; and
   decoding the effective QM,
   wherein the decoding the effective QM comprises:
      determining a value of the first flag syntax element, according to a sampling rate of a chroma component relative to a luma component; and
      based on the sampling rate of the chroma component relative to the luma component being 4:0:0, determining that the value of the first flag syntax element is 0, indicating that the chroma QM does not need to be decoded, and inferring that elements of the chroma QM are 16.

2. The video decoding method according to claim 1, further comprising:
   determining an effective size range of a QM according to the syntax elements comprised in the first parameter set; and
   determining a QM within the effective size range as the effective QM.

3. The video decoding method according to claim 2, wherein the determining the effective size range of the QM comprises:
   determining a minimum luma coding block size, a block size of a luma coding tree, and a maximum luma transform block (TB) size according to the syntax elements comprised in the first parameter set;
   determining an effective size range of a luma QM according to the minimum luma coding block size, the block size of the luma coding tree, and the maximum luma TB size, the effective size range of the luma QM comprising a minimum size and a maximum size of the luma QM; and
   determining an effective size range of the chroma QM according to the effective size range of the luma QM and a sampling rate of a chroma component relative to a luma component, the effective size range of the chroma QM comprising a minimum size and a maximum size of the chroma QM.

4. The video decoding method according to claim 3, wherein the determining the effective size range of the luma QM according to the minimum luma coding block size, the block size of the luma coding tree, and the maximum luma TB size comprises:
   determining the minimum size of the luma QM according to the minimum luma coding block size; and
   determining a larger value of the block size of the luma coding tree and the maximum luma TB size as the maximum size of the luma QM.

5. The video decoding method according to claim 2, wherein the determining the effective size range of the QM comprises:
   determining an effective size range of a luma QM according to the syntax elements comprised in the first parameter set, the effective size range of the luma QM comprising a minimum size and a maximum size of the luma QM; and
   determining an effective size range of the chroma QM according to the effective size range of the luma QM and a sampling rate of a chroma component relative to a luma component, the effective size range of the chroma QM comprising a minimum size and a maximum size of the chroma QM.

6. The video decoding method according to claim 5, wherein the determining the effective size range of the chroma QM comprises:
   calculating the minimum size of the chroma QM according to the minimum size of the luma QM and the sampling rate of the chroma component relative to the luma component; and
   calculating the maximum size of the chroma QM according to the maximum size of the luma QM and the sampling rate of the chroma component relative to the luma component.

7. The video decoding method according to claim 3, wherein the method further comprises:
   determining a first QM as the effective QM based on the first QM meeting one of a first condition and a second condition,
   the first condition being cIdx==0 && (matrixQMSize>=minQMSizeY && matrixQMSize<=maxQMSizeY), and indicating that the first QM is a luma component and is used in a quantization process of a luma TB, the first QM being within the effective size range [MinQMSizeY, MaxQMSizeY] of the luma QM, MinQMSizeY representing the minimum size of the luma QM, and MaxQMSizeY representing the maximum size of the luma QM, and
   the second condition being cIdx!=0 && (matrixQMSize>=minQMSizeUV && matrixQMSize<=maxQMSizeUV), and indicating that the first QM is a chroma component and is used in a quantization process of a chroma TB, the first QM being within the effective size range [MinQMSizeUV, MaxQMSizeUV] of the chroma QM, MinQMSizeUV representing the minimum size of the chroma QM, and MaxQMSizeUV representing the maximum size of the chroma QM.

8. The video decoding method according to claim 1, wherein the method further comprises:
   reading a value of a flag syntax element corresponding to a first QM from the first parameter set;

determining, based on the value of the flag syntax element corresponding to the first QM being a first value, that the first QM is the effective QM; and determining, based on the value of the flag syntax element corresponding to the first QM being a second value, that the first QM is not the effective QM.

9. The video decoding method according to claim 8, wherein the first flag syntax element is scaling_matrix_present_flag and wherein a first chroma QM and a second chroma QM having a common prediction mode and a common size share the first flag syntax element, indicating whether the first chroma QM and the second chroma QM need to be decoded.

10. The video decoding method according to claim 1, wherein the first parameter set is an adaptive parameter set (APS).

11. The video decoding method according to claim 1, wherein for any other QM that is not the effective QM, all elements of the QM are predefined by a default value.

12. The video decoding method according to claim 11, wherein the default value is 16.

13. A video decoding apparatus comprising:
at least one memory configured to store program code; and
at least one processor configured to read the program code and operate as instructed by the program code, the program code comprising:
parameter obtaining code configured to cause at least one of the at least one processor to obtain a first parameter set corresponding to a to-be-decoded video frame, the first parameter set comprising related syntax elements used for defining a quantization matrix (QM);
QM determining code configured to cause at least one of the at least one processor to determine an effective QM according to a first flag syntax element comprised in the first parameter set, wherein the first flag syntax element is configured to indicate whether a chroma QM needs to be decoded, and wherein the effective QM beiftg-is a QM actually used for inversely quantizing quantized transform coefficients during decoding of the to-be-decoded video frame; and
QM decoding code configured to cause at least one of the at least one processor to decode the effective QM,
wherein the QM determining code is further configured to cause at least one of the at least one processor to :
determine a value of the first flag syntax element, according to a sampling rate of a chroma component relative to a luma component; and
based on the sampling rate of the chroma component relative to the luma component being 4:0:0, determine that the value of the first flag syntax element is 0, indicating that the chroma QM does not need to be decoded, and inferring that elements of the chroma QM are 16.

14. The video decoding apparatus according to claim 13, wherein the QM determining code is further configured to cause at least one of the at least one processor to:
determine an effective size range of a QM according to the syntax elements comprised in the first parameter set; and
determine a QM within the effective size range as the effective QM.

15. The video decoding apparatus according to claim 14, wherein the QM determining code is further configured to cause at least one of the at least one processor to:
determine a minimum luma coding block size, a block size of a luma coding tree, and a maximum luma transform block (TB) size according to the syntax elements comprised in the first parameter set;
determine an effective size range of a luma QM according to the minimum luma coding block size, the block size of the luma coding tree, and the maximum luma TB size, the effective size range of the luma QM comprising a minimum size and a maximum size of the luma QM; and
determine an effective size range of the chroma QM according to the effective size range of the luma QM and a sampling rate of a chroma component relative to a luma component, the effective size range of the chroma QM comprising a minimum size and a maximum size of the chroma QM.

16. The video decoding apparatus according to claim 15, wherein the QM determining code is further configured to cause at least one of the at least one processor to:
determine the minimum size of the luma QM according to the minimum luma coding block size; and
determine a larger value of the block size of the luma coding tree and the maximum luma TB size as the maximum size of the luma QM.

17. The video decoding apparatus according to claim 14, wherein the QM determining code is further configured to cause at least one of the at least one processor to:
determine an effective size range of a luma QM according to the syntax elements comprised in the first parameter set, the effective size range of the luma QM comprising a minimum size and a maximum size of the luma QM; and
determine an effective size range of the chroma QM according to the effective size range of the luma QM and a sampling rate of a chroma component relative to a luma component, the effective size range of the chroma QM comprising a minimum size and a maximum size of the chroma QM.

18. The video decoding apparatus according to claim 17, wherein the QM determining code is further configured to cause at least one of the at least one processor to:
calculate the minimum size of the chroma QM according to the minimum size of the luma QM and the sampling rate of the chroma component relative to the luma component; and
calculate the maximum size of the chroma QM according to the maximum size of the luma QM and the sampling rate of the chroma component relative to the luma component.

19. A non-transitory computer-readable storage medium, storing a computer program, the computer program being executable by at least one processor to cause the at least one processor to perform a video decoding method comprising:
obtaining a first parameter set corresponding to a to-be-decoded video frame, the first parameter set comprising related syntax elements used for defining a quantization matrix (QM);
determining an effective QM according to a first flag syntax element comprised in the first parameter set, wherein the first flag syntax element is configured to indicate whether a chroma QM needs to be decoded, and wherein the effective QM is a QM actually used for inversely quantizing quantized transform coefficients during decoding of the to-be-decoded video frame; and decoding the effective QM,
wherein the decoding the effective QM comprises:
- determining a value of the first flag syntax element, according to a sampling rate of a chroma component relative to a luma component; and
- based on the sampling rate of the chroma component relative to the luma component being 4:0:0, determining that the value of the first flag syntax element is 0, indicating that the chroma QM does not need to be decoded, and inferring that elements of the chroma QM are 16.

* * * * *